(12) United States Patent
Langford et al.

(10) Patent No.: US 11,049,006 B2
(45) Date of Patent: Jun. 29, 2021

(54) COMPUTING SYSTEM FOR TRAINING NEURAL NETWORKS

(71) Applicant: Microsoft Technology Licensing, LLC, Redmond, WA (US)

(72) Inventors: John Langford, Scarsdale, NY (US); Gang Li, Beijing (CN); Frank Torsten Bernd Seide, Beijing (CN); James Droppo, Carnation, WA (US); Dong Yu, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1094 days.

(21) Appl. No.: 15/510,356

(22) PCT Filed: Sep. 12, 2014

(86) PCT No.: PCT/CN2014/086398
§ 371 (c)(1),
(2) Date: Mar. 10, 2017

(87) PCT Pub. No.: WO2016/037351
PCT Pub. Date: Mar. 17, 2016

(65) Prior Publication Data
US 2017/0308789 A1    Oct. 26, 2017

(51) Int. Cl.
*G06N 3/08* (2006.01)
*G06N 7/00* (2006.01)
*G06N 3/04* (2006.01)

(52) U.S. Cl.
CPC ............. *G06N 3/08* (2013.01); *G06N 3/04* (2013.01); *G06N 3/0454* (2013.01); *G06N 3/084* (2013.01); *G06N 7/005* (2013.01)

(58) Field of Classification Search
CPC .......... G06N 3/04; G06N 3/0454; G06N 3/08; G06N 3/084; G06N 7/005
See application file for complete search history.

(56) References Cited

U.S. PATENT DOCUMENTS

| 5,107,442 A | 4/1992 | Weideman |
| 10,152,676 B1 * | 12/2018 | Strom ................ G06N 7/005 |

(Continued)

FOREIGN PATENT DOCUMENTS

| CN | 1963491 | 5/2007 |
| CN | 101448048 | 6/2009 |
| CN | 1839397 A | 9/2017 |

OTHER PUBLICATIONS

Seide et al., "Conversational Speech Transcription Using Context-Dependent Deep Neural Networks", In the Proceedings of the 2011 INTERSPEECH, Aug. 28, 2011, 4 pages. (Year: 2011).*

(Continued)

*Primary Examiner* — Kamran Afshar
*Assistant Examiner* — Marshall L Werner
(74) *Attorney, Agent, or Firm* — Schwegman Lundberg & Woessner, P.A.

(57) ABSTRACT

Techniques and constructs can reduce the time required to determine solutions to optimization problems such as training of neural networks. Modifications to a computational model can be determined by a plurality of nodes operating in parallel. Quantized modification values can be transmitted between the nodes to reduce the volume of data to be transferred. The quantized values can be as small as one bit each. Quantization-error values can be stored and used in quantizing subsequent modifications. The nodes can operate in parallel and overlap computation and data transfer to further reduce the time required to determine solutions. The quantized values can be partitioned and each node can aggregate values for a corresponding partition.

14 Claims, 6 Drawing Sheets

(56) References Cited

U.S. PATENT DOCUMENTS

| | | | | |
|---|---|---|---|---|
| 2008/0260276 | A1* | 10/2008 | Yamatani | H04N 19/60 382/249 |
| 2012/0233486 | A1* | 9/2012 | Phull | G06F 9/5083 713/375 |
| 2014/0067738 | A1 | 3/2014 | Kingsbury | |
| 2014/0142929 | A1 | 5/2014 | Seide et al. | |
| 2014/0164299 | A1 | 6/2014 | Sainath et al. | |
| 2015/0347819 | A1* | 12/2015 | Yin | G06K 9/00288 382/118 |
| 2017/0147920 | A1 | 5/2017 | Huo et al. | |

OTHER PUBLICATIONS

Dean et al., "Large Scale Distributed Deep Networks", In the Proceedings of Advances in Neural Information Processing Systems 25, Dec. 2013, 11 pages. (Year: 2013).*

Zhang et al., "Asynchronous Stochastic Gradient Descent for DNN Training", In the Proceedings of the 2013 International Conference on Acoustics, Speech and Signal Processing (ICASSP), May 2013, 4 pages. (Year: 2013).*

"First Office Action Issued in Chinese Patent Application No. 201480068322.8", dated Apr. 16, 2018, 16 Pages.

"Office Action Issued in European Patent Application No. 14901717.0", dated Sep. 25, 2017, 10 Pages.

"Search Report Issued in European Patent Application No. 14901717.0", dated Aug. 21, 2017, 4 Pages.

"Summons to Attend Oral Proceedings Issued in European Patent Application No. 14901717.0", Mailed Date: May 8, 2018, 11 Pages.

Seide, et al., "1-Bit Stochastic Gradient Descent and its Application to Data-Parallel Distributed Training of Speech DNNs", In Proceedings of Fifteenth Annual Conference of the International Speech Communication Association, Sep. 14, 2014, pp. 1058-1062.

Kingsbury, et al., "Scalable Minimum Bayes Risk Training of Deep Neural Network Acoustic Models Using Distributed Hessian-free Optimization", In Proceedings of Thirteenth Annual Conference of the International Speech Communication Association, Sep. 9, 2012, pp. 10-13.

"Third Office Action Issued in Chinese Patent Application No. 201480068322.8", dated May 7, 2019, 07 Pages.

Boyd et al., "Distributed Optimization and Statistical Learning via the Alternating Direction Method of Multipliers", In the Proceedings of the Foundations and Trends in Machine Learning, vol. 3, No. 1, Nov. 19, 2010, 70 pages.

Chen et al., "Pipelined Back-Propagation for Context-Dependent Deep Neural Networks", In the Proceedings of the 13th Annual Conference of the International Speech Communication Association, Sep. 9, 2012, 4 pages.

Coates et al., "Deep Learning with COTS HPC Systems", In the Proceedings of the 30th International Conference on Machine Learning, vol. 28, Jun. 16, 2013, 9 pages.

Dahl et al., "Context-Dependent Pre-trained Deep Neural Networks for Large Vocabulary Speech Recognition", In the Proceedings of the 2010 IEEE Transactions on Audio, Speech, and Language Processing, Jan. 2011, 13 pages.

Dean et al., "Large Scale Distributed Deep Networks", In the Proceedings of Advances in Neural Information Processing Systems 25, Dec. 2013, 11 pages.

"Delta-sigma Modulation", retrieved on Aug. 6, 2014, available at <<http://en.wikipedia.org/wiki/Delta-sigma_modulation>>, Wikipedia Foundation, Inc., 17 pages.

Deng et al., "Roles of Pre-Training and Fine-Tuning in Context-Dependent DBN-HMMs for Real-World Speech Recognition", In the Proceedings of the 2010 NIPS Workshop on Deep Learning and Unsupervised Feature Learning, Dec. 2010, 8 pages.

Duchi et al., "Adaptive Subgradient Methods for Online Learning and Stochastic Optimization", The Journal of Macine Learning Research, vol. 12, Feb. 1, 2011, 23 pages.

Franco et al. "Context-Dependent Connectionist Probability Estimation in a Hybrid HMM-Neural Net Speech Recognition System", In the Proceedings of Compujter Speech & Language, vol. 8, Iss. 3, Jul. 1994, 52 pages.

Hinton et al., "A Fast Learning Algorithm for Deep Belief Nets", In the Journal of Neural Computation, vol. 18, Iss. 7. Jul. 2006, 16 pages.

"IWSLT2013-Evaluation Campaign" retrieved on Aug. 6, 2014 available at <<http://workshop2013.iwslt.org/59.php>>, 3 pages.

Kingsbury, Brian "Lattice-Based Optimization of Sequence Classification Criteria for Neural-Network Acoustic Modeling", In the Proceedings of the 2009 IEEE International Conference on Acoustics, Speech and Signal Processing, May 2009, pp. 3761-3764.

Kiros, Ryan, "Training Neural Networks with Stochastic Hessian-Free Optimization", In the Proceedings of the International Conference on Learning Representations, May 2013, 11 pages.

Krishnamurthy et al., "Neural Networks for Vector Quantization of Speech and Images", IEEE Journal on Selected Areas in Communications, vol. 8, Iss. 8, Sep. 2006, 9 pages.

Linguistic Data Consortuim, "Switchboard-1 Release 2", retrieved on Aug. 6, 2014, available at <<https://catalog.ldc.uppen.edu/LDC97S62>>, Trustees of the University of Pennsylvania, 1997, 2 pages.

Le et al., "Building High-level Features Using Large Scale Unsupervised Learning", In the Proceedings of the 29th International Conference in Machine Learning, Jun. 26, 2012, 11 pages.

Levine, Earl, "Stochastic Vector Quantization, and Stochastic VQ With State Feedback Using Neural Networks", In the Proceedings of the 1996 Data Compression Conference, Mar. 1996, 10 pages.

Martens, James "Deep Learning via Hessian-free Optimization", In the Proceedings of the 27th International Conference on Machine Learning, Jun. 2010, 8 pages.

Niu et al., "Hogwild! A Lock-Free Approach to Parallelizing Stochastic Gradient Descent", In the Proceedings of Advances in Neural Information Processing Systems 24, Jun. 2011, 22 pages.

PCT International Preliminary Report on Patentability dated Mar. 23, 2017 for PCT application No. PCT/CN2014/086398, 7 pages.

PCT Search Report and Written Opinion dated Jun. 17, 2015 for PCT Application No. PCT/CN2014/086398, 12 Pages.

Riedmiller et al., "A Direct Adaptive Method for Faster Backprapagation Learning: The RPROP Algorithm", In the Proceedings of the 1993 IEEE International Conference on Neural Networks, vol. 1, Mar. 1993, pp. 586-591.

Rosenblatt, Frank, "Principles of Neurodynamics: Perceptrons and the Theory of Brain Mechanisms", Spartan Books, Buffalo, N.Y., USA, Mar. 15, 1961, 626 pages.

Rumelhart et al., "Learning Representations by Back-Propagating Errors", In the Journal of Nature, vol. 323, Oct. 9, 1986, pp. 533-536.

Sainath et al., "Optimization Techniques to Improve Training Speed of Deep Neural Networks for Large Speech Tasks", In the Proceedings of the 2013 IEEE Transactions on Audio, Speech, and Language Processing, vol. 21, Iss. 11, Nov. 2013, 10 pages.

Seide et al., "Conversational Speech Transcription Using Context-Dependent Deep Neural Networks", In the Proceedings of the 2011 INTERSPEECH, Aug. 28, 2011, 4 pages.

Seide et al., "Feature Engineering in Context-Dependent Deep Neural Networks for Conversational Speech Transcription", In the Proceedings of the IEEE Workshop on Automatic Speech Recognition and Understanding, Dec. 11, 2011, 6 pages.

Seide et al., "On Parallelizability of Stochastic Gradient Descent for Speech DNNS", In the Proceedings of the IEEE International Conference on Acoustics, Speech and Signal Processing, May 2014, 5 pages.

Senior et al., "An Empirical Study of Learning Rates in Deep Neural Networks for Speech Recognition", In the Proceedings of the 2013 International Conference on Acoustics, Speech and Signal Prcessing (ICASSP), May 2013, pp. 6724-6728.

Ucan et al., "Performance of Gray Scaled Images Using Segmented Cellular Neural Network-Cellular Neural Network Combined Trellis Coded Quantization/Modulation (SCNN-CNN CTCQ/TCM) Approach Over Rcian Fading Channel", Dogus University Journal, vol. 1, No. 1, Mar. 2011, pp. 217-224.

(56) References Cited

OTHER PUBLICATIONS

Vanhoucke et al., "Improving the Speed of Neural Networks on CPUs", In the Proceedings of the 2011 Deep Learning and Unsupervised Feature Learning Workshop, NIPS 2011, Dec. 16, 2011, 8 pages.
Wiesler et al., "Investigations on Hessian-Free Optimization for Cross-Entropy Training of Deep Neural Networks", In the Proceedings of INTERSPEECH, Aug. 2013, 5 pages.
Wiesler et al., "Mean-Normalized Stochastic Gradient for Large-Scale Deep Learning", In the Proceedings of the 2014 IEEE International Conference on Acoustic, Speech and Signal Processing (ICASSP), May 2014, pp. 180-184.
Xue et al., "Restructuring of Deep Neural Network Acoustic Models with Signular Value Decomposition", In the Proceedings of the 2013 INTERSPEECH Conference, Aug. 25, 2013, pp. 2365-2369.
Zhang et al., "Asynchronous Stochastic Gradient Descent for DNN Training", In the Proceedings of the 2013 International Conference on Acoustics, Speech and Signal Processing (ICASSP), May 2013, 4 pages.
Zhang et al., "Improving Deep Neural Network Acoustic Modiels Using Generalized Maxout Networks", In the Proceedings of the 2014 IEEEE International Conference on Acoustics, Speech and Signal Processing (ICASSP), May 2014, 5 pages.
Zhou et al., "A Cluster-Based Multiple Deep Neural Networks Method for Large Vocabulary Continuous Speech Recognition", In the Proceedings of the 2013 IEEE International Conference on Acoustic, Speech and Signal Processing (ICASSP), May 2013, 5 pages.
"Second Office Action Issued in Chinese Patent Application No. 201480068322.8", dated Dec. 3, 2018, 11 Pages.

* cited by examiner

COMPUTING SYSTEM FOR TRAINING NEURAL NETWORKS

CROSS REFERENCE TO RELATED APPLICATIONS

This application is a 35 U.S.C. 371 National Stage Application of International Application No. PCT/CN2014/086398, filed Sep. 12, 2014 and entitled "Computing System for Training Neural Networks" (published as WO 2016/037351), the entire contents of which are incorporated herein by reference.

BACKGROUND

Deep neural networks are useful for a range of recognition problems. For example, acoustic modeling techniques that use context-dependent deep neural network hidden Markov models (CD-DNN-HMMs) for speech recognition or speech-to-text transcription outperform acoustic modeling techniques that use conventional Gaussian-mixture based HMMs. Unlike Gaussian-mixture based HMMs, CD-DNN-HMMs use artificial neural networks with multiple hidden layers ("deep neural networks") to directly model tied context-dependent states. However, the training of CD-DNN-HMMs for use in speech recognition is more time consuming than the training of Gaussian-mixture based HMMs. The larger amount of training time for deep neural networks compared to other approaches is a major obstacle to the use of deep neural networks for recognition problems, e.g., speech recognition.

Attempts have been made to improve the training for conventional deep neural networks by using parallelization, for example, independently processing speech utterances across multiple servers. At the end of a batch of hundreds of millions of frames, partial statistics from the servers may be merged, and an updated model may be distributed to the servers. However, the size of the updated model corresponding to the hundreds of millions of frames often exceeds the capacity of available computation resources.

SUMMARY

This disclosure describes systems, methods, and computer-readable media for mathematically optimizing solutions to computational models, e.g., for training deep neural networks (DNNs). In at least one example, each of a plurality of nodes determines modification values of the computational model (e.g., gradient values computed using training data and the DNN model). The nodes quantize the modification values and transmit the quantized values to others of the nodes. An updating module in each node modifies the computational model according to received quantized values. Example techniques described herein determine gradient matrices of the DNN, quantize the gradient matrices using stored error matrices, update the stored error matrices, and exchange the quantized gradient matrices with other nodes.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
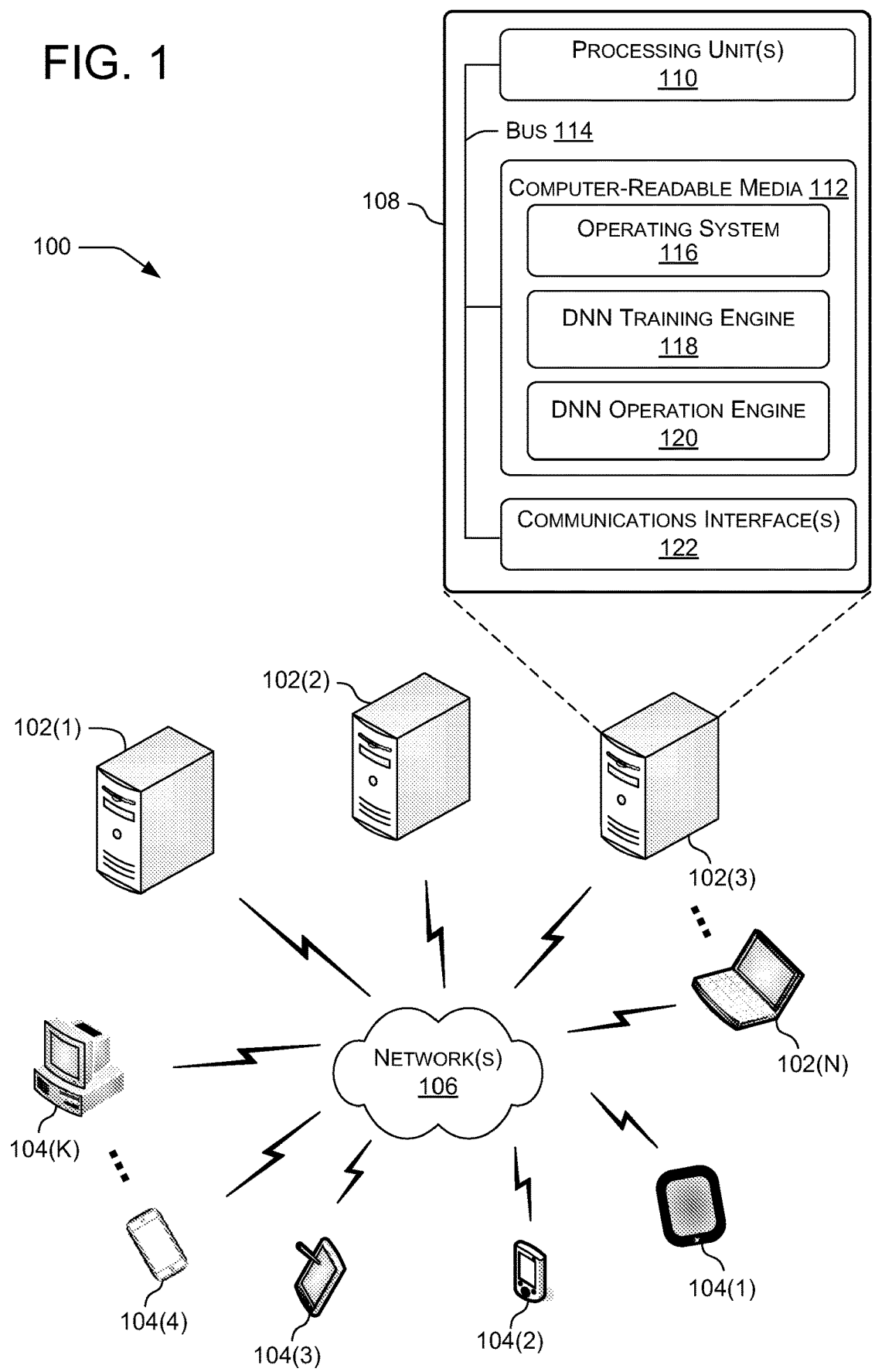
FIG. 1 is a block diagram depicting an example environment for implementing training of deep neural networks as described herein.

Examples described herein provide techniques and constructs to improve the speed of training of neural networks, e.g., DNNs, by more efficiently exchanging data using resources including, for example, processing units. Such resources may be implemented using specialized programming or hardware programmed with specific instructions to implement the specified functions. For example, resources may have different execution models, as is the case for graphics processing units (GPUs) and computer central processing units (CPUs). Resources configured for training of deep neural networks can provide rapid training of DNNs using data-parallel architectures. This can greatly expand the fields of use in which DNNs can serve, and can permit more rapid improvement of DNN-based systems by increasing the number of model-tuning cycles that can be run during model development. In some examples, DNNs can be rapidly trained to convert speech to text for persons unable to type or to convert text to speech for the benefit of the visually impaired. In various examples, DNNs can be trained to facilitate users' entering information or queries into mobile devices that have no keyboards or small keyboards.

Described herein are enhanced techniques for training neural networks, including deep neural networks herein referred to as DNNs, to speed up the training of the DNNs for use in performing pattern recognition and data analysis, such as speech recognition, speech synthesis, regression analysis or other data fitting, image classification, or face recognition. In various examples, e.g. of DNNs trained for speech recognition or other use cases noted herein, the DNNs may be context-dependent DNNs or context-independent DNNs. A DNN can have at least two hidden layers. A neural network trained using techniques herein can have one hidden layer, two hidden layers, or more than two hidden layers. In an example, e.g., useful with speech recognition systems, a neural network or DNN as described herein has between five and seven layers. Herein-described techniques relating to DNNs also apply to neural networks with less than two hidden layers unless otherwise expressly stated. In some instances, such as for speech recognition, the context-dependent DNNs may be used in conjunction with hidden Markov Models (HMMs). In such instances, the combination of context-dependent DNNs and HMMs is known as context-dependent DNN-HMMs (CD-DNN-HMMs). Thus, the techniques described herein for training DNNs may be applied to train the CD-DNN-HMMs. The techniques described herein may include the use of an algorithm to parallelize the training of the DNNs across multiple processing units, e.g., cores of a multi-core processor or multiple general-purpose graphics processing units (GPGPUs). Accordingly, multiple layers of DNNs may be processed in parallel on the multiple processing units.

Neural networks such as DNNs are commonly trained with minibatch-based stochastic gradient descent (SGD). SGD can be parallelized along three dimensions, model parameters, layers, and data (and combinations thereof). All three parallelization techniques as implemented in prior schemes suffer from very high bandwidth cost that restricts the speed-up from parallelization. For example, data parallelism requires compute nodes to exchange and merge hundreds of millions of model parameters, which can take significantly more time than the respective parallelized computation. As a consequence, only small if any speed-ups can be attained in these schemes.

Techniques herein may include the use of model striping. In model striping, the output layer of the DNNs or any hidden DNN layer may be processed in parallel across multiple processing units.

The techniques may reduce the amount of time used to train the DNNs for a particular purpose, such as for speech recognition. The decreased training time may lead to an increase in the implementation and usage of the DNNs in performing speech-to-text transcription or text-to-speech synthesis.

In some examples, algorithms for DNN training as described herein can be performed on a computing device, such as a smart phone, a tablet, a desktop computer, a server, a server blade, a supercomputer, etc. The resulting DNNs can be used on such computing devices. The resulting DNNs can be used on computing devices having one or more input devices, such as a physical keyboard, a soft keyboard, a touch screen, a touch pad, microphone(s), camera(s), etc. to provide device optimized functions such as speech recognition, image recognition and search, and speech synthesis.

Various examples, scenarios, and examples of techniques for training of the DNNs for data analysis in accordance with various examples are presented in greater detail in the description of the following figures.

Illustrative Environment

FIG. 1 shows an example environment 100 in which examples of deep neural network (DNN) training systems can operate or in which mathematical optimization methods such as example DNN training methods can be performed. In some examples, the various devices or components of environment 100 include computing device(s) 102(1)-102(N) (individually or collectively referred to herein with reference 102) and computing devices 104(1)-104(K) (individually or collectively referred to herein with reference 104) that can communicate with one another via one or more network(s) 106. In some examples, N=K; in other examples, N>K or N<K. In some examples, computing devices 102 and 104 can communicate with external devices via network(s) 106.

For example, network(s) 106 can include public networks such as the Internet, private networks such as an institutional or personal intranet, or some combination of private and public networks. Network(s) 106 can also include any type of wired or wireless network, including but not limited to local area networks (LANs), wide area networks (WANs), satellite networks, cable networks, Wi-Fi networks, WiMAX networks, mobile communications networks (e.g., 3G, 4G, and so forth) or any combination thereof. Network(s) 106 can utilize communications protocols, including packet-based or datagram-based protocols such as internet protocol (IP), transmission control protocol (TCP), user datagram protocol (UDP), other types of protocols, or combinations thereof. Moreover, network(s) 106 can also include a number of devices that facilitate network communications or form a hardware basis for the networks, such as switches, routers, gateways, access points, firewalls, base stations, repeaters, backbone devices, and the like. Network(s) 106 can also include devices that facilitate communications between computing devices 102, 104 using bus protocols of various topologies, e.g., crossbar switches, INFINIBAND switches, or FIBRE CHANNEL switches or hubs.

In some examples, network(s) 106 can further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), other standards, e.g., BLUETOOTH, or multiples or combinations thereof.

In various examples, at least some of computing devices 102(1)-102(N) or 104(1)-104(K) can operate in a cluster or grouped configuration to, e.g., share resources, balance load, increase performance, or provide fail-over support or redundancy. Computing device(s) 102, 104 can belong to a variety of categories or classes of devices such as traditional client-type or server-type devices, desktop computer-type devices, mobile-type devices, special purpose-type devices, embedded-type devices, or wearable-type devices. Thus, although illustrated as, e.g., desktop computers, laptop computers, tablet computers, or cellular phones, computing device(s) 102, 104 can include a diverse variety of device types and are not limited to a particular type of device. Computing device(s) 102 can represent, but are not limited to, desktop computers, server computers, web-server computers, personal computers, mobile computers, laptop computers, tablet computers, wearable computers, implanted computing devices, telecommunication devices, automotive computers, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, computer navigation type client computing devices, satellite-based navigation system devices including global positioning system (GPS) devices and other satellite-based navigation system devices, telecommunication devices such as mobile phones, tablet computers, mobile phone-tablet hybrid devices, personal data assistants (PDAs), or other computing device(s) configured to participate in DNN training or operation as described herein. In at least one example, computing device(s) 102 include servers or high-performance computers configured to train DNNs. In at least one example, computing device(s) 104 include laptops, tablet computers, smartphones, home desktop computers, or other computing device (s) configured to operate trained DNNs, e.g., to provide text data in response to speech input from a microphone.

Computing device(s) 102, 104 can include various components illustrated at inset 108. Computing device(s) 102, 104 can include any computing device having one or more processing unit(s) 110 operably connected to one or more computer-readable media 112 such as via a bus 114, which in some instances can include one or more of a system bus, a data bus, an address bus, a PCI bus, a Mini-PCI bus, and any variety of local, peripheral, or independent buses, or any combination thereof. In at least one example, plural processing units 110 may exchange data through an internal interface bus (e.g. PCIe), rather than or in addition to network 106. Executable instructions stored on computer-readable media 112 can include, for example, an operating system 116, a DNN training engine 118, a DNN operation engine 120, and other modules, programs, or applications that are loadable and executable by processing unit(s) 110. In an example not shown, one or more of the processing unit(s) 110 in one of the computing device(s) 102, 104 can be operably connected to computer-readable media 112 in a different one of the computing device(s) 102, 104, e.g., via communications interface 122 and network 106. For example, program code to perform DNN training steps herein can be downloaded from a server, e.g., computing device 102(1), to a client, e.g., computing device 104(K), e.g., via the network 106, and executed by one or more processing unit(s) 110 in computing device 104(K). In an example, computing device(s) 102(1)-102(N) include DNN training engine 118, and computing device(s) 104(1)-104(K) include DNN operation engine 120.

Processing unit(s) 110 can be or include one or more single-core processors, multi-core processors, central processing units (CPUs), graphics processing units (GPUs), general-purpose graphics processing units (GPGPUs), or hardware logic components such as accelerators configured, e.g., via programming from modules or APIs, to perform functions described herein. For example, and without limitation, illustrative types of hardware logic components that can be used in or as processing units 110 include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and Digital Signal Processors (DSPs). For example, an accelerator can represent a hybrid device, such as one from ALTERA or XILINX that includes a CPU core embedded in an FPGA fabric. These or other hardware logic components can operate independently or, in some instances, can be driven by a CPU.

The processing unit(s) 110 may be configured to execute an operating system 116 that is installed on the computing device 102. In some examples, the processing unit(s) 110 may be or include general-purpose graphics processing units (GPGPUs). In further examples, the processing units 110 may be field-programmable gate arrays (FPGAs), or another type of customizable processor. In various examples, at least some of computing device(s) 102(1)-102(N) can include a plurality of processing units 110 of multiple types. For example, the processing units 110 in computing device 102(1) may be a combination of one or more GPGPUs and one or more FPGAs.

Computing device 102 can also include one or more communications interfaces 122 to enable wired or wireless communications between computing device 102 and other networked computing devices 102 involved in DNN training, or other computing device(s), over network(s) 106. Such communications interface(s) 122 can include one or more transceiver devices, e.g., network interface controllers (NICs) such as Ethernet NICs, to send and receive communications over a network. The processing units 110 may exchange data through the communications interface 122. In an example, the communications interface 122 may be a Peripheral Component Interconnect express (PCIe) transceiver, and the network 106 can be a PCIe bus. In some examples, the communications interface 122 can include, but is not limited to, a transceiver for cellular, Wi-Fi, Ultra-wideband (UWB), BLUETOOTH, or satellite transmissions. The communications interface 122 can include a wired I/O interface, such as an Ethernet interface, a serial interface, a Universal Serial Bus (USB) interface, an INFINIBAND interface, or other wired interfaces. For simplicity, these and other components are omitted from the illustrated computing device 102.

While the processing units 110 are described as residing on the computing device 102 and connected by the communications interface 122 in various examples, the processing units 110 may also reside on different computing devices in some examples. In some examples, the processing units 110 may reside on corresponding computing devices 102, and may exchange data through a network 106 via communications interface 122. In some examples, at least two of the processing units 110 may reside on different computing devices 102. In such examples, multiple processing units 110 on the same computing device 102 may use an interface bus 114 of the computing device 102 to exchange data, while processing units 110 on different computing devices 102 may exchange data via network(s) 106.

Computer-readable described herein, e.g., computer-readable media 112, may include computer storage media and/or communication media. Computer storage media can include tangible storage units such as volatile memory, nonvolatile memory, or other persistent or auxiliary computer storage media, removable and non-removable computer storage media implemented in any method or technology for storage of information such as computer-readable instructions, data structures, program modules, or other data. Computer-readable media 112 or memory 320, FIG. 3, can be an example of computer storage media. Thus, the computer-readable media 112 or memory 320 includes tangible or physical forms of media included in a device or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media.

In some examples, computer-readable media 112 can store instructions executable by the processing unit(s) 110 that, as discussed above, can represent a processing unit incorporated in computing device 102. Computer-readable media 112 can also store instructions executable by external processing units such as by an external CPU or external processor or accelerator of any type discussed above. In various examples at least one processing unit 110, e.g., a CPU, GPU, or accelerator, is incorporated in computing device 102, while in some examples at least one processing unit 110, e.g., one or more of a CPU, GPU, or accelerator, is external to computing device 102.

Computer-readable media 112 of the computing device 102 may store an operating system 116. In some examples, operating system 116 is not used (commonly referred to as a "bare metal" configuration). In various examples, operating system 116 may include components that enable or direct the computing device 102 to receive data via various inputs (e.g., user controls, network or communications interfaces, or memory devices), and process the data using the processing unit(s) 110 to generate output. The operating system 116 may further include one or more components that present the output (e.g., display an image on an electronic display, store data in memory, transmit data to another electronic device, etc.). The operating system 116 may enable a user to interact with modules of the training engine 118 using a user interface (not shown). Additionally, the operating system 116 may include components that perform various functions generally associated with an operating system, e.g., storage management and internal-device management.

Illustrative Components

Figure 2:
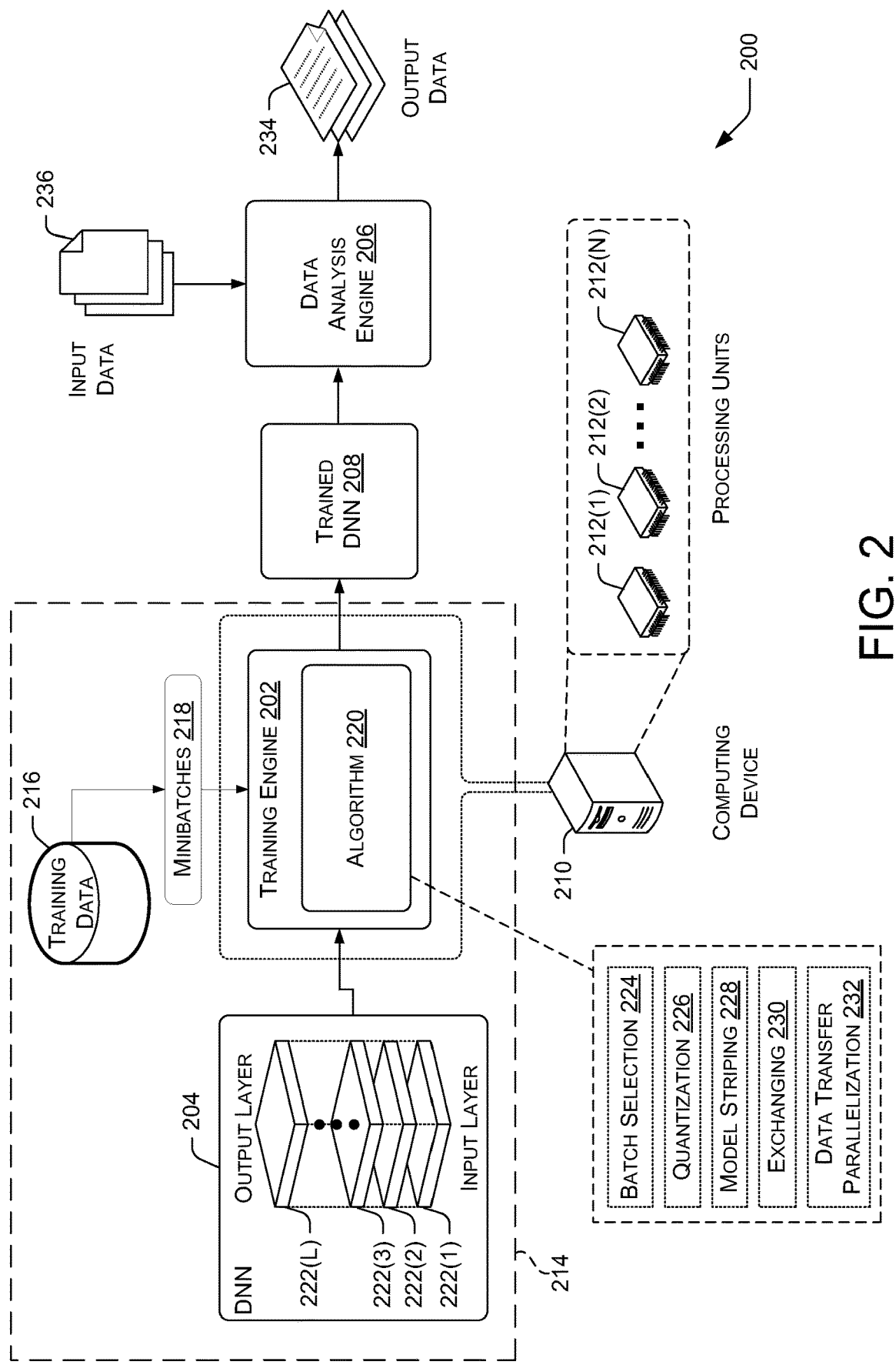
FIG. 2 is a block diagram that illustrates an example scheme for implementing a training engine that uses an algorithm to train deep neural networks.

FIG. 2 is a block diagram that illustrates an example technique 200 for implementing a training engine 202, such as training engine 118, that uses algorithms to train deep neural network (DNN) 204 (or a plurality of DNNs, and likewise throughout), and for implementing a data analysis engine 206, such as DNN operation engine 120, to operate trained DNN 208. The training engine 202 may be implemented using a computing device 210, which, in some instances, can include computing device(s) 102. The data analysis engine 206 may be implemented using a computing device such as computing device(s) 104. For clarity, a separate computing device implementing data analysis engine 206 is not shown in FIG. 2. In at least one example, computing device 210 implements both training engine 202 and data analysis engine 206. The computing device 210 may include one or more processing units 212(1)-212(N), which can represent processing units 110(1)-110(N) as discussed above with reference to FIG. 1. Processing units 212(1)-212(N) are individually or collectively referred to herein with reference 212. In some examples, the processing units 212 may be processing units 212 as discussed above with reference to FIG. 1, e.g., GPGPUs. The processing units 212 may exchange data through a bus 114 or a network 106, both FIG. 1. The processing units 212 can carry out instructions of DNN training block 214 including DNN 204, training engine 202, training data 216, and minibatches 218 of training data 216. Minibatches 218 are discussed below.

DNN training can be performed by multiple nodes in a parallel manner to reduce the time required for training. Throughout this disclosure, the term "node" refers to a device or portion of a device configured as part of such a parallel DNN training arrangement. In at least one example, training engine 202 executes on each of a plurality of computing devices 210, and each computing device 210 has exactly one single-core processing unit 212. Each such computing device 210 is a node in this example. In some examples, training engine 202 executes on a single computing device 210 having a plurality of multi-core processing units 212. In such examples, each core of the multi-core processing units 212 represents a node. Other combinations, and points between these extremes, can also be used. For example, an individual accelerator (e.g., an FPGA) can include one or more nodes. In other examples, multiple cores of a processing unit 212 can be configured to operate together as a single node.

The training engine 202 may use an algorithm 220 to train DNN 204 for performing data analysis, such as for use in speech recognition. The DNN 204 may be a multi-layer perceptron (MLP). As such, the DNN 204 may include a bottom input layer 222(1) and a top layer 222(L) (integer L>1), as well as multiple hidden layers, such as the multiple layers 222(2)-222(3). Layers 222(1)-222(L) are individually or collectively referred to herein with reference 222. In some examples using context dependent DNNs, DNN 204 may include a total of eight layers (N=8). In various examples, the DNN 204 may be context-dependent DNNs or context-independent DNNs. Training data 216 may be used by the algorithm 220 as training data to train the DNN 204. The training data 216 may include a speech corpus that includes audio data of a collection of sample speech from human speakers. For example, the speech corpus may include North American English speech samples collected from speakers of North American English in the United States and Canada. However, in other examples, the training data 216 may include sample speech in other respective languages (e.g., Chinese, Japanese, French, etc.), depending on the desired language of the speech to be recognized, or other kinds of training data for different applications like handwriting recognition or image classification. Training data 216 can also include information about the correct recognition or classification answers for the corpus. Using this information, errors can be detected in the processing of the corpus by the DNN 204. This information can be used, e.g., in computing the gradient with respect to the model parameters of the value D of the cross-entropy criterion of, for example, Equation (1) below. In various examples, this information is used in computing a value of a criterion such as a mean squared error ("quadratic cost") function. Training data 216 can also include a test set of a second corpus and correct classification data for that second corpus. The performance of DNN 204 can be evaluated on the test set to adjust the training so DNN 204 performs effectively beyond the limits of the training corpus.

The computations performed by the algorithm 220 may be parallelized across the processing units 212. For example, during back-propagation, a computation on input data performed by the processing unit 212(1) may produce a first computation result. The first computation result may be pipelined to the processing unit 212(2) for further computation to generate a second computation result. Concurrent with the generation of the second computation result, the processing unit 212(1) may be processing additional input data to generate a third computation result. In at least some examples, concurrent with the generation of the second computation result, the processing unit 212(1) may be transferring at least part of the first computation result to another processing unit 212. Such concurrent computations by the processing units 212 or other examples of nodes may result in a pipelining of computations that train the DNN 204, and, accordingly, to a reduction of computation time due to the resulting parallelism of computation. Concurrent computation and communication by the processing units 212 or other examples of nodes may result in reduced delay time waiting for data to arrive at a node and, accordingly, to a reduction of overall computation time.

In various examples, the computations performed by the algorithm 220 may be enhanced using one or more techniques, such as batch selection 224, quantization 226, model striping 228, exchanging 230, and data transfer parallelization 232. Since the training data 216 is processed by the algorithm as minibatches 218 of input samples, as discussed below, batch selection 224 may include configuring the size of input sample batches or minibatches to balance computation accuracy and execution efficiency according to selected criteria. In an example, the size may be selected to maximize both computation accuracy and execution efficiency of the algorithm 220. In an example, the size may be selected to maximize execution efficiency of the algorithm 220 while providing a selected level of computation accuracy. The batch selection 224 can be performed as part of the algorithm 220 or as a separate code module from the algorithm 220, as shown. In at least one example, gradients are computed for sub-minibatches as described below.

Further, the layers 222(1)-222(L) in the DNN 204 may have varying sizes due to differences in the number of units in various layers of the DNN 204. For example, a largest layer in the DNN 204 may have a size that is ten times larger than that of the one or more smallest layers. Accordingly, it may be more efficient to devote a particular multi-core processor to process the largest layer, while processing two or more of the smallest layers on another multi-core processor. Such grouping may reduce roundtrip delays and improve efficiency.

Quantization 226 is reducing the amount of information to be sent between nodes by reducing the precision with which data values are represented. The algorithm 220 can transfer, e.g., gradient values of a neural network model between nodes. The gradient values may be 32-bit IEEE 754 floating-point values (C language "float" values), 64-bit (C "double") values, or values of other bit depths. Quantization 226 can include transmitting representations (e.g., approximations) of the gradient values from one node, the representations using fewer bits than the gradient values, e.g., fewer than 32 bits, e.g., 1 bit. Quantization 226 also includes the inverse operation of "reconstruction," i.e., interpreting quantized values received at a node as specific 32-bit values or other values having higher precision or bit depth than the gradient values, e.g., more than one bit. Quantization 226 includes tracking "error values," values representing the difference between gradient values and their quantized representations, and determining quantization values based partly on the error values. This advantageously permits maintaining the accuracy of the training process by spreading quantization error over successive gradient values. Quantization 226 is discussed below, e.g., with reference to Equations (10), (11), (12), (13), (14), and (15). In an example discussed below with reference to Equation (10), the quantization values are determined by adding the error of a previous minibatch to a current minibatch's gradient value before quantization.

Model striping 228 is the processing of portions of the computational model of the DNN 204 by multiple, respective processing units, such as a plurality of the processors of the processing units 212. Model striping 228 is also referred to herein as "model parallelism."

Exchanging 230 is the transmission of gradient values between nodes. This permits model updates to be effectively computed in a data-parallel manner across a large number of nodes. This in turn reduces the elapsed time required to train the DNN 204. In various examples, exchanging 230 is performed in cooperation with quantization 226 to exchange quantized gradient values between the nodes. Exchanging 230 can include partitioning the gradient values and performing a distributed all-reduce to provide updates to the gradient values to all the nodes. Exchanging 230 is discussed below with reference to FIGS. 5 and 6.

A computation iteration of the algorithm 220 may execute the following steps: forward propagation of input data, error back propagation, and model update. Data transfer parallelization 232 may include parallelizing the streaming of the output data from a computation iteration of the algorithm 220 with other steps in the computation iteration. For example, gradient matrices can be transferred concurrently with computation. In instances in which streaming time is shorter than computation time, such parallelization may reduce or eliminate time delay in performing computations due to the exchange of data between processing units during execution of the algorithm 220. In at least one example, the forward propagation, back propagation, and model update steps are performed in that order.

Thus, by using the algorithm 220 and the training data 216, the training engine 202 may produce trained DNN 208 from the DNN 204. In turn, the data analysis engine 206 may use the trained DNN 208 to produce output data 234 from the input data 236. In some examples, the data analysis engine 206 may be a speech-to-text engine that uses the trained DNN 208 in the form of trained context-dependent DNN-HMMs. The speech-to-text engine may use the trained context-dependent DNN-HMMs to produce output data 234 in the form of output text from the input data 236 that is in the form of input speech. The data analysis engine 206 may be executed on the computing device 210 or a computing device that is similar to the computing device 210. Moreover, the data analysis engine 206 may receive live input data 236 from a microphone and audio processing components of the computing device 210, which can be, e.g., a smartphone computing device 104(5), FIG. 1. In various examples, the data analysis engine 206 may receive input data 236 from a media file or stream, for example for the purpose of audio-indexing of the spoken content in the media file/stream. In some examples, the data analysis engine 206 may also be a text-to-speech engine that uses the trained context-dependent DNNs to synthesize output speech (output data 234) based on input text (input data 236), or a handwriting-recognition engine.

In some examples, the algorithm 220, as enhanced with one or more of the techniques described herein, e.g., techniques 224-232, may be implemented to produce trained context-independent DNN 208 under other scenarios that exhibit similar characteristics. In this way, context-independent forms of the DNN 204 may be trained with appropriate training data for a variety of data analysis purposes. The characteristics may include a larger set of training data that results in prolonged processing time (e.g., greater than 50 million, 1.3 billion, etc. samples), DNN structures in which the output of each network of the DNNs exceeds a threshold (e.g., greater than two thousand, four thousand, etc. outputs from a DNN), or so forth. The data analysis purposes may include using trained context-independent DNNs for activities such as image recognition, handwriting recognition, computer vision, video tracking, or so forth.

Figure 3:
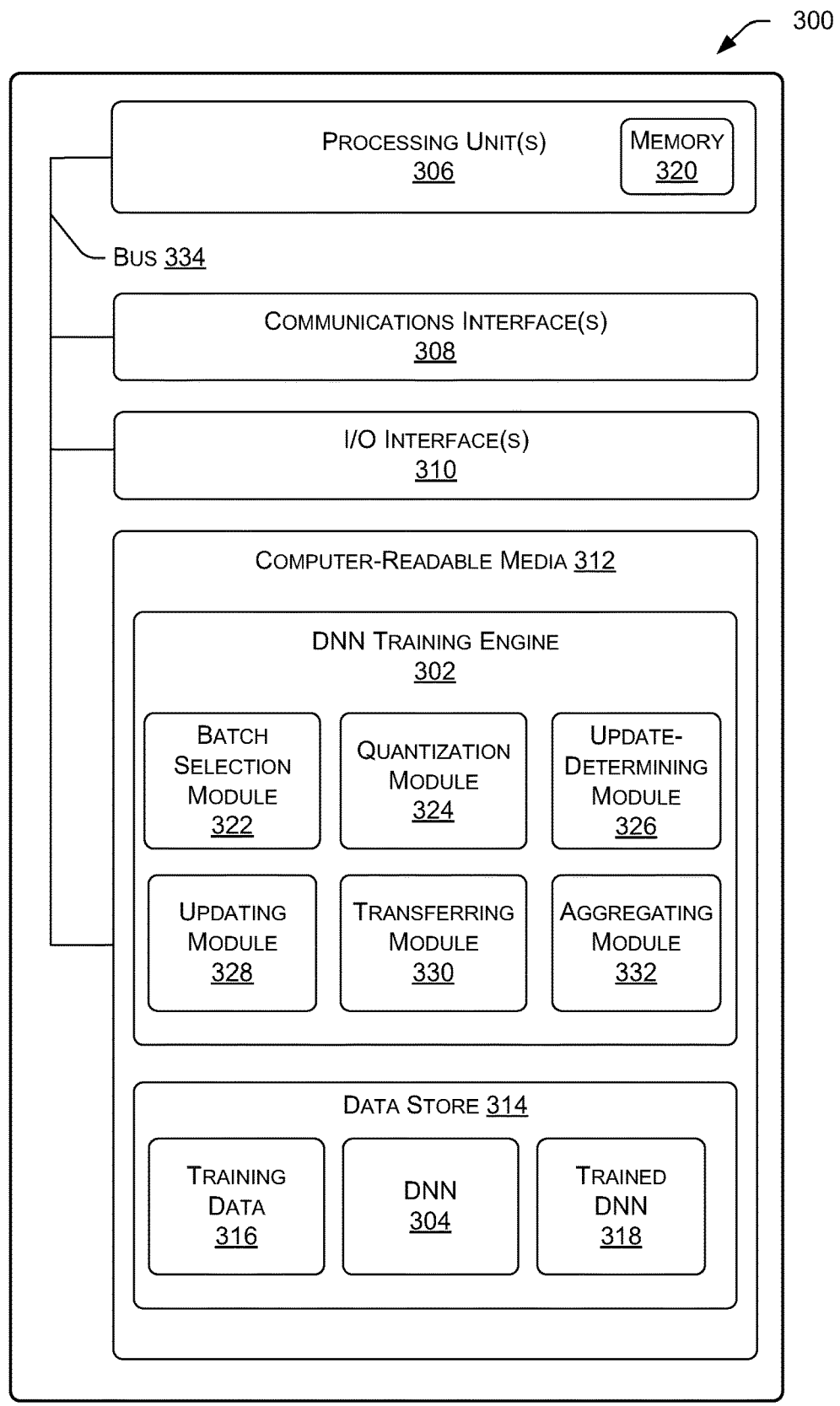
FIG. 3 is a block diagram depicting an example computing device configured to participate in neural network training according to various examples described herein.

FIG. 3 is an illustrative diagram that shows example components of a computing device 300, which can represent computing device(s) 102, 104, 210. Computing device 300 can implement the training engine 302, such as training engine 118, 202, to train the DNN 304. Computing device 300 can be used for determining solutions to one or more mathematical-optimization problems, e.g., mathematical minimization problems. For example, DNN training by an exemplary stochastic gradient descent (SGD) process can involve mathematically minimizing, e.g., a cross-entropy D (Equation (1)). Computing device 300 can be configured to include or operate as one or more nodes. In various examples, the DNN 304 may be a context-dependent DNN or a context-independent DNN.

The computing device 300 may include one or more processing unit(s) 306, which can represent processing unit(s) 110, 212. Processing unit(s) 306 can include, e.g., processing unit types described above such as CPU- or GPGPU-type processing unit(s). In various examples, the computing device 300 may be a server, a desktop computer, another type of electronic device, or another device type noted above, or a combination of any of those, that is capable of hosting one or more processing unit(s) 306 to process data.

The computing device 300 can also include a communications interface 308, which can represent communications interface 122. For example, communications interface 308 can include a transceiver device such as a NIC to send and receive communications over a network, e.g., as discussed above. As such, the computing device 300 may have network capabilities. For example, the computing device 300 may exchange data with other electronic devices (e.g., laptops, computers, servers, etc.) via one or more networks 106, such as the Internet.

Computing device 300 can further include one or more input/output (I/O) interface(s) 310 to allow computing device 300 to communicate with input/output devices (not shown) such as user input devices including peripheral input devices (e.g., a keyboard, keypad, a mouse, a pen, a game controller, a voice input device such as a microphone, voice-recognition device, or speech-recognition device, a touch input device, a gestural input device such as a touch-screen, and the like) and output devices including peripheral output devices (e.g., a visual display, a printer, audio speakers, a haptic output, and the like). Computing device 300 can communicate via I/O interface 310 with any other suitable devices or other electronic/software interaction methods. Such communications can be used, e.g., on computing devices 300 implementing data analysis engine 206. Input data 236 can be received via I/O interface(s) 310, e.g., from a user or a computer system such as a monitoring system, and output data 234 can be provided via I/O interface(s) 310, e.g., to a user or a computer system such as a reporting system.

Computing device 300 can also include one or more computer-readable media 312, which can represent computer-readable media 112. The computer-readable media 312 can include an operating system, e.g., operating system 116 (omitted for clarity). In the illustrated example, computer-readable media 312 includes a data store 314. In some examples, data store 314 includes data storage, structured or unstructured, such as a database or data warehouse. In some examples, data store 314 includes a corpus or a relational database with one or more tables, arrays, indices, stored procedures, and so forth to enable data access including one or more of hypertext markup language (HTML) tables, resource description framework (RDF) tables, web ontology language (OWL) tables, or extensible markup language (XML) tables, for example. Data store 314 can store data for the operations of processes, applications, components, or modules stored in computer-readable media 312 or executed by processing unit(s) or accelerator(s) 306. In at least one example, the data store may store training data 316, a DNN 304 or other mathematical model, data used for training the DNN 304 such as temporary variables, a trained DNN 318, or any combination thereof. Some or all of the above-referenced data can be stored on separate memories 320 on board one or more processing unit(s) 306, such as a memory on board a CPU-type processor, a GPU-type processor, an FPGA-type accelerator, a DSP-type accelerator, or another accelerator. Memory 320 can include, e.g., a CPU or GPU cache memory.

In at least one example, a system includes one or more computer-readable media 312 having thereon a plurality of modules and a computational model of an optimization problem. For example, computer-readable media 312 of the computing device 300 may store the modules of the DNN training engine 302. The computational model can include, e.g., a neural-network model such as DNN 304. The system can include a plurality of nodes, e.g., computing device(s) 300 or nodes executing thereon. A node can include at least one processing unit 306 (e.g., a processor or a core of a processor) 306 operably coupled to at least one of the computer-readable media 312. The processing units 306 can be adapted to intercommunicate and to execute modules of the plurality of modules. For example, computing device 300 can include one or more node(s) and communicate with node(s) of other computing device(s) 300 via the network 106. The nodes of the computing devices 300 in the system can cooperate as described herein to determine modification values for an optimization problem, e.g., gradients for neural network training.

The modules stored on computer-readable media 312 of the DNN training engine 302 can include one or more modules or APIs, which are illustrated as a batch selection module 322, a quantization module 324, an update-determining module 326, an updating module 328, a transferring module 330, and an aggregating module 332. The modules can also include a model-striping module, e.g., implementing model striping 228, and a data-transfer parallelization module, e.g., implementing data transfer parallelization 232 (both omitted for clarity). The number of modules can vary higher or lower, and modules of various types can be used in various combinations. For example, functionality described associated with the illustrated modules can be combined to be performed by a fewer number of modules or APIs or can be split and performed by a larger number of modules or APIs. For example, the quantization module 324 and the transferring module 330 can be combined in a single module that performs both functions. In various example, the processing unit(s) 306 can access the module(s) on the computer-readable media 312 via a bus 334, which can represent bus 114, FIG. 1. Communications interface 308 and I/O interface 310 can also communicate with processing unit(s) 306 via bus 334.

In an example, the modules include the update-determining module 326 configured to determine modification values of the computational model. The quantization module 324 can be configured to quantize the determined modification values using, e.g., incorporating, stored error values and to update the stored error values using the determined modification values and the quantized modification values. This can be, e.g., as described above with reference to quantization 226. The transferring module 330 can be configured to transmit at least some of the quantized modification values to at least one other of the nodes, e.g., processing units 306. This can be, e.g., as described above with reference to exchanging 230. The transferring module 330 can also be configured to receive modification values from other nodes, and the aggregating module 332 can be configured to aggregate data in data store 314 with data received from other nodes. The operation of the transferring module 330 in one example is discussed below with reference to FIGS. 5 and 6. The updating module 328 can be configured to modify the stored computational model according to received quantized modification values. The updating module 328 can be configured to modify the stored computational model according to aggregated received modification values provided by the aggregating module 332. These functions are discussed further below.

Update-determining module 326 and updating module 328 may use the algorithm 220 to train the DNN 304 based on the training data 316, which may be a speech corpus. In instances in which the DNN 304 is trained for speech analysis purposes, the DNN 304 may be a context-dependent DNN that is used in conjunction with an HMM. In some examples, the DNN may be a context-independent DNN. The DNN 304 may be a MLP that models the posterior probability $P_{s|o}(s|o)$ of a class s (e.g., a triphone or senone), given an observation vector o (e.g., audio data), as a stack of (L+1) layers of log-linear models. The first L layers, l=0 ... L−1, model posterior probabilities of hidden binary vectors $h^l$ (the outputs of the hidden layers) given input vectors $v^l$ to the hidden layers, while the top layer L models the desired class posterior in accordance with Equations (1), (2), and (3). Equations (1), (2), and (3) use weight matrices $W^l$ and bias vectors $a^l$, where $h_j^l$ and $z_j^l(v^l)$ are the $j^{th}$ component of $h^l$ and $z^l(v^l)$, respectively.

$$P_{h|v}^\ell(h^\ell | v^\ell) = \prod_{j=1}^{N^\ell} \frac{e^{z_j^\ell(v^\ell) \cdot h_j^\ell}}{e^{z_j^\ell(v^\ell) \cdot 1} + e^{z_j^\ell(v^\ell) \cdot 0}}, 0 \le \ell < L \quad (1)$$

$$P_{s|v}^L(s | v^L) = \frac{e^{z_s^L(v^L)}}{\sum_{s'} e^{z_{s'}^L(v^L)}} = softmax_s(z^L(v^L)) \quad (2)$$

$$z^\ell(v^\ell) = (W^\ell)^T v^\ell + a^\ell; v^\ell \stackrel{def}{=} E^{\ell-1}\{h^{\ell-1}\} \quad (3)$$

Full out-summation over all hidden variables is sometimes infeasible. In that case, this summation may be approximated by a "mean-field approximation" where the inputs $v^l$ to the hidden layers are taken as the expectations of the corresponding output vectors $h^l$ of the previous layer. Further, for use with the DNN 304, state posteriors $P_{s|o}(s|o)$ may be converted to scaled likelihoods by dividing by their prior.

Accordingly, the update-determining module 326 and the updating module 328 may train the DNN 304 according to the cross entropy criterion D shown in Equation (4):

$$D = \sum_{t=1}^{T_{corpus}} \log P_{s|o}(s(t) | o(t)) \quad (4)$$

by using stochastic gradient descent (SGD) as shown in Equation (5), with learning rate £:

$$(W^\ell, a^\ell) \leftarrow (W^\ell, a^\ell) + \varepsilon \frac{\partial D}{\partial (W^\ell, a^\ell)}, 0 \le \ell < L \quad (5)$$

The gradients ∂D/∂·are as shown in Equations (6), (7), (8), and (9), with error signals $e^l(t)$, the component-wise derivatives $\sigma_j'(z) = \sigma_j(z) \cdot (1 - \sigma_j(z))$, and (log softmax)$_j'(z) = \delta_{s(t),j} -$ softmax$_j(z)$, and Kronecker delta δ.

$$\frac{\partial D}{\partial W^\ell} = \sum_t v^\ell(t)(\omega^\ell(t)e^\ell(t))^T; \frac{\partial D}{\partial a^\ell} = \sum_t \omega^\ell(t)e^\ell(t) \quad (6)$$

$$e^L(t) = (\log softmax)'(z^L(v^L(t))) \quad (7)$$

$$e^{\ell-1} = W^\ell \cdot \omega^\ell(t) \cdot e^\ell(t) \text{ for } 0 \le \ell < L \quad (8)$$

$$\omega^\ell(t) = \begin{cases} \text{diag}(\sigma'(z^\ell(v^\ell(t)))) & \text{for } 0 \le \ell < L \\ 1 & \text{else} \end{cases} \quad (9)$$

These equations provide a formulation that can mathematically optimize cross-entropy.

In at least one example, update-determining module 326 determines gradients, e.g., ∂D/∂·values, Equation (6), of DNN 304 based on a minibatch 218 selected from the training data 316. The update-determining module is configured to determine the modification values using a stochastic gradient descent algorithm. Updating module 328 modifies the stored computational model, e.g., of DNN 304, based on the gradients (modification values) from one or more nodes, Equation (5). The quantization module 324 and the transferring module 330 cooperate to provide the determined gradients as needed to the nodes. Examples of transfer are discussed below with reference to FIGS. 5-6.

The training of the DNN 304 may be achieved by pipelining computations of back-propagation in a parallelized fashion (i.e., simultaneously executing multiple computations) using multiple nodes, e.g., multiple processing units 306. In various examples, pipelining is not used. In some examples, one or more of the nodes communicate concurrently with computation.

Convergence (i.e., training completion) may be achieved by performing the stochastic gradient descent, as described above in Equation (5), using discretely sized batches of randomly sampled frames 218 from the training data 316, referred to herein as "minibatches." The size of the minibatches may be limited by the parallelized computation nature of the algorithm 220. For instance, model updates to the DNN 304, which involve the exchange of data between processing units, are used for the computation iterations of the algorithm 220. However, model updates across multiple processing units may use a high amount of bandwidth during the execution of the algorithm 220. In one example, the DNN 304 (with seven hidden layers) may include 100 million parameters. In such an example, the processing of a reasonably sized minibatch of sample frames with respect to the DNN 304 may translate into the gathering and redistribution of 400 megabytes (MB) worth of gradients by each of the nodes.

The size of an individual minibatch that is used to train the DNNs may be constrained by two factors. The upper constraint for the minibatch size is the frequency of model updates. Larger minibatch size for the minibatches 218 of sample frames may result in less model updates. However, increasing the minibatch size may result in the loss of computation accuracy, especially during early computation iterations of the algorithm 220. Such loss of computation accuracy may result in prolonged execution time for the algorithm 220 to reach convergence, i.e., to complete the training of the DNN 304. In extreme cases, the prolonged execution time may even result in a failure of the algorithm 220 to reach convergence, i.e., failure to complete the training. The lower constraint for the minibatch size is the efficiency in the utilization of the nodes and the processing units 306 therein. The efficiency in the use of the computation cycles performed by the nodes may decrease as a minibatch size for the sample frame minibatches 218 is reduced. Thus, excess reduction in minibatch size may also lead to inefficiencies that prolong the execution time for the algorithm 220 to reach convergence.

In at least one example, a batch selection module 322 may partition the training data 316 into randomly sampled frame minibatches 218 based on the configured minibatch size, e.g., as noted above with reference to batch selection 224. An example of minibatches is discussed below with reference to FIG. 5. The batch selection module 322 may configure the minibatch size for the sample frame minibatches 218 based on rates of data transfers between the processing units and numbers of operations per second that the processing units 306 are capable of executing. To increase efficiency of computations, the minibatch size can be set so that the time required to perform computations on a minibatch is approximately equal to the time required to transfer data relating to that minibatch to and from a node. In at least one example, minibatch size is selected as high as possible while providing at least a selected accuracy, and the number of nodes is selected so that the time to perform computations using the selected size of minibatch is substantially equal to the time required to communicate gradients for a minibatch of the selected size. This permits data transfers to overlap with computations. For example, given an array of 2-4 GPGPUs that are capable of 2-4 tera floating point operations per second (TFLOPS), and transfer rates of 6 gigabytes (GB)/s between the GPGPUs, the minibatch size may be in the range of 256 to 1024 sample frames per sample minibatch.

In at least one example, the batch selection module 322 may configure a larger minibatch size when the rates of data transfers for the processing units 306 are relatively superior to the execution speeds of the processing units 306. Conversely, the batch selection module 322 may configure a smaller minibatch size when the execution speeds of the processing units 306 are relatively superior to the rates of data transfers between the processing units 306.

Example computation iterations performed by the algorithm 220 may execute the following steps: forward propagation of input data, error back propagation, and model update. These steps can be executed in the listed order or another order. The forward propagation of the input data can be described by Equations (1), (2), and (3), the error back propagation can be described by Equation (8), and the model update can be described by Equation (5).

Further, the data transfer parallelization 232 technique involves the parallelization of data transfer with computation. A first part of the data transfer parallelization 232 may occur after the performance of an error back propagation step. In this part, output data from a computation at a node that processes one portion of the model data or training data 316 may be streamed to another node that processes a different portion of the model of the DNN 304 or training data 316. Such streaming may be performed in parallel or partially in parallel with a model update step or an input data forward propagation step, as the model update step and the forward propagation step use data that is different from the output data. Likewise, after the performance of the input data forward propagation step, output data from a computation at one node may be streamed to another node. Such streaming may be performed in parallel or partially in parallel with the computation of an error for another error back propagation step. Thus, in examples in which streaming time is shorter than compute time, the use of the data transfer parallelization 232 may reduce or eliminate any time delay resulting from the exchange of data between multiple processing units.

As noted above, model striping 228 is the parallelization of the processing of portions of the DNN 304 across multiple nodes including processing units, such as the processing units 306. Each node can compute a stripe (portion) of the gradients. The gradient stripes may then be, e.g., distributed to other nodes, e.g., processing units of the processing units 306, or exchanged among nodes for completing computation of the current iteration of the model (e.g., training computations using the current minibatch of training data). In various examples, model striping 228 can be used together with data parallelism, e.g., by running data in parallel across multiple groups of model-parallel nodes. Data parallelism is described below, e.g., with reference to Equation (16). In an example, model striping 228 can be used together with layer parallelism to permit more flexibly processing layers in parallel.

In at least one example of a system for mathematical optimization of computational models, e.g., for neural network training such as DNN training, each of the nodes includes a plurality of processing units 306 operably coupled to the respective computer-readable media 312. Each processing unit 306 in this example is configured to execute at least the update-determining module 326. In an example, the system can include a crossbar (e.g., network 106, FIG. 1) communicatively connecting the nodes. The nodes can be configured to execute the transferring module 330 to transmit the at least some of the quantized modification values via the crossbar concurrently with executing the update-determining module 326. The at least one processing unit 306 of each node can, in some examples, includes a general-purpose graphics processing unit (GPGPU) configured to execute the updating module 328 and the quantization module 324, and a computer central processing unit (CPU) configured to execute the transferring module 330.

The computer-readable media 312 according to various examples have thereon computer-executable instructions. The computer-executable instructions, upon execution, configure a computer, e.g., the computing device 300 or the processing unit 306 therein, to perform operations. The operations can include operations discussed below with reference to FIGS. 4-6. In at least one example, the operations can include determining first values of a gradient of a neural network model using a set of training samples. This can be done by the update-determining module 326. Backpropagation techniques including stochastic gradient descent and Hessian-free methods can be controlled by the instructions in update-determining module 326.

Figure 5:
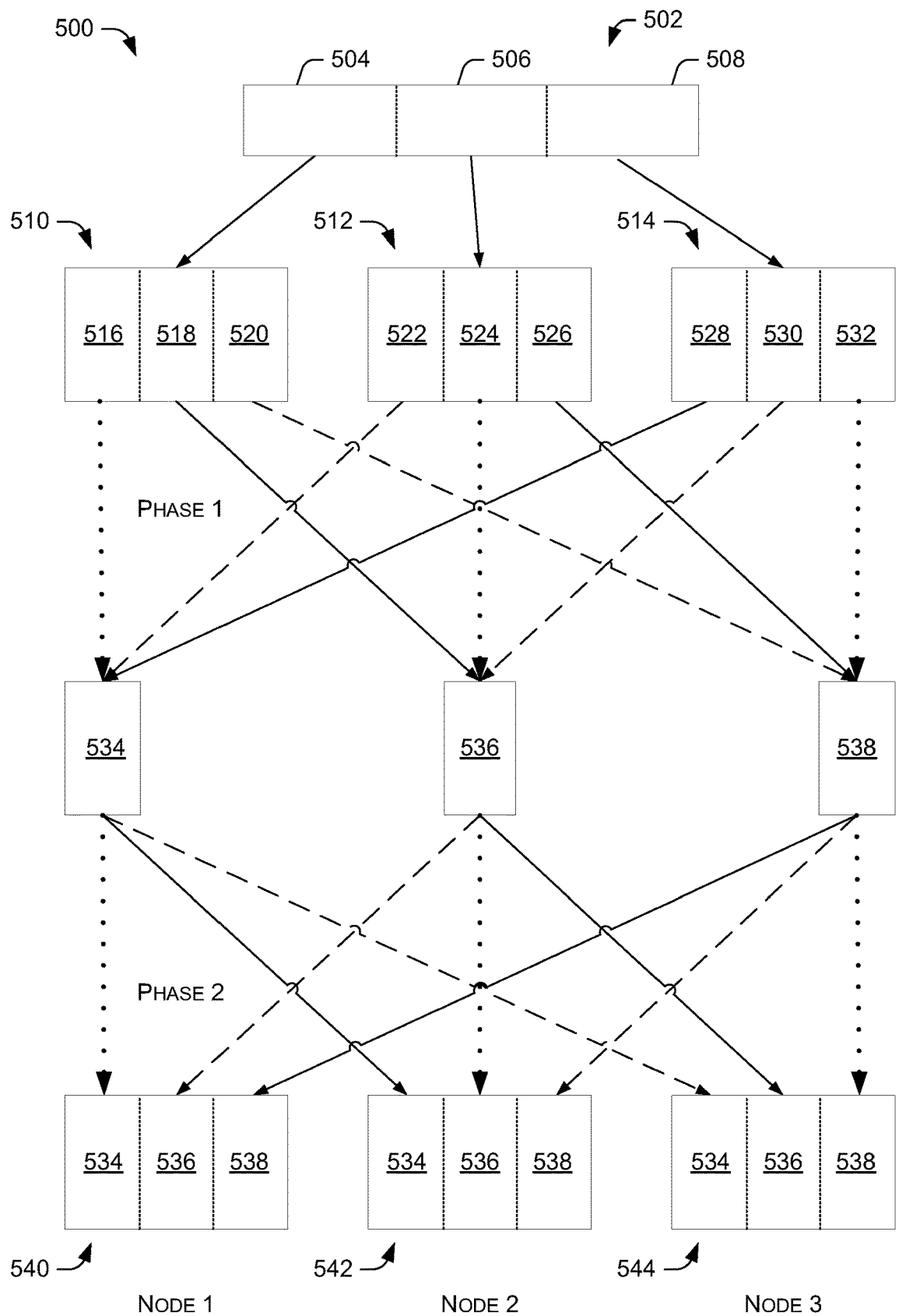
FIG. 5 is a dataflow diagram showing example process for exchanging data between nodes for training a deep neural network.

The operations further include transmitting a first portion of the first values of the gradient and receiving second values corresponding to a second, different portion of the first values of the gradient, e.g., by the transferring module 330. The operations can include overlapping the transmitting and the receiving. Examples of overlap are shown in FIG. 5.

The first and second portions of the values can correspond to different stripes of the model, e.g., as discussed below with reference to FIG. 5. For example, the first portion of the first values of the gradient transmitted by Node 1, FIG. 5, can be stripe 518, corresponding to Subset 2 of the DNN 304. Node 1 can receive stripe 522, which corresponds to different Subset 1 of the DNN 304. The corresponding second portion of the first values is stripe 516, in this example.

The operations can further include aggregating the second portion, e.g., stripe 516, with the received second values, e.g., stripe 522. This can be done by the aggregating module 332. The operations can then include transmitting the aggregated values, e.g., using the transferring module 330. This permits effective data-parallel DNN training.

In at least one example, the operations further include quantizing the determined first values before transmitting the first portion. The operations can also include determining reconstructed (inverse quantization) values and transforming the received second values using the reconstructed values before the aggregating. These operations can be performed by the quantization module 324, which can determine the reconstructed values, e.g., at least partly based on the values of the gradient.

For example, the reconstructed value for a quantized value of q can be the mean of all the gradients in a previous minibatch that quantized to q (see, e.g., Equation (14)). Histories of reconstructed values for respective quantized values q can be recorded and smoothed, e.g., using an exponentially-weighted moving average (EWMA) or moving window. The reconstructed values can be recomputed every n minibatches, for a selected n, or at random intervals.

In any technique averaging or otherwise using gradients to determine reconstruction values, some gradients can be omitted from the average or combination of gradients. For example, outliers can be omitted from the average, or randomly-selected elements can be omitted. In various examples, the reconstructed values are determined by the quantization module 324 and are transmitted with the quantized data. This still results in a savings in data transmitted. For example, the dimension X of a group of values quantized together can be, e.g., 2048, and the samples can be float values. The unquantized data are 32X bits. Quantizing to 1 bit, and transmitting two 32-bit float reconstructed values (one for "0" bits and one for "1" bits) with the data, reduces the data transfer requirement to X+2×32. This is a savings for any integer X≥3.

In various examples of a DNN training system, e.g., implementing computer program instructions such as those described above, at least one of the nodes in the system can transmit the quantized modification values directly to at least one other of the nodes. That is, the nodes can communicate in a peer-to-peer topology rather than in a master-slave topology. However, examples herein are not limited to peer-to-peer and can operate with various topologies of node interconnection. Using peer-to-peer transfers can advantageously permit multiple nodes to transfer data simultaneously and so more efficiently use available bandwidth.

In at least one example, individual nodes in the system include respective memories 320 coupled to the respective at least one processing unit 306. In this example, an individual memory 320 can be configured to store respective private quantization state for the corresponding node, e.g., including the stored error values described above with reference to quantization 226, FIG. 2. In some of these examples, the nodes advantageously do not share state regarding the quantization error. This permits the nodes to operate independently as regards quantization, which can reduce the amount of state data to be transferred and increase training speed.

In some examples, a node includes a CPU connected to the communications interface 308, and a GPGPU configured to carry out instructions in the update-determining module 326. In some of these examples, the transferring module 330 can, for example, be configured to transfer second quantized modification values from the GPGPU to the CPU in parallel with transferring the at least some of the quantized modification values to the at least one other of the nodes or other processing units 306. In this way, computation and data transfers can be overlapped not only between nodes, but also within nodes. This can permit maintaining high utilization factors on both computational and communication resources in the node, improving training speed. In systems supporting direct memory access (DMA) between devices such as CPUs, GPGPUs, or network controllers, DMA transfers can be used to move data within a node in parallel with computations.

Illustrative Processes

Figure 4:
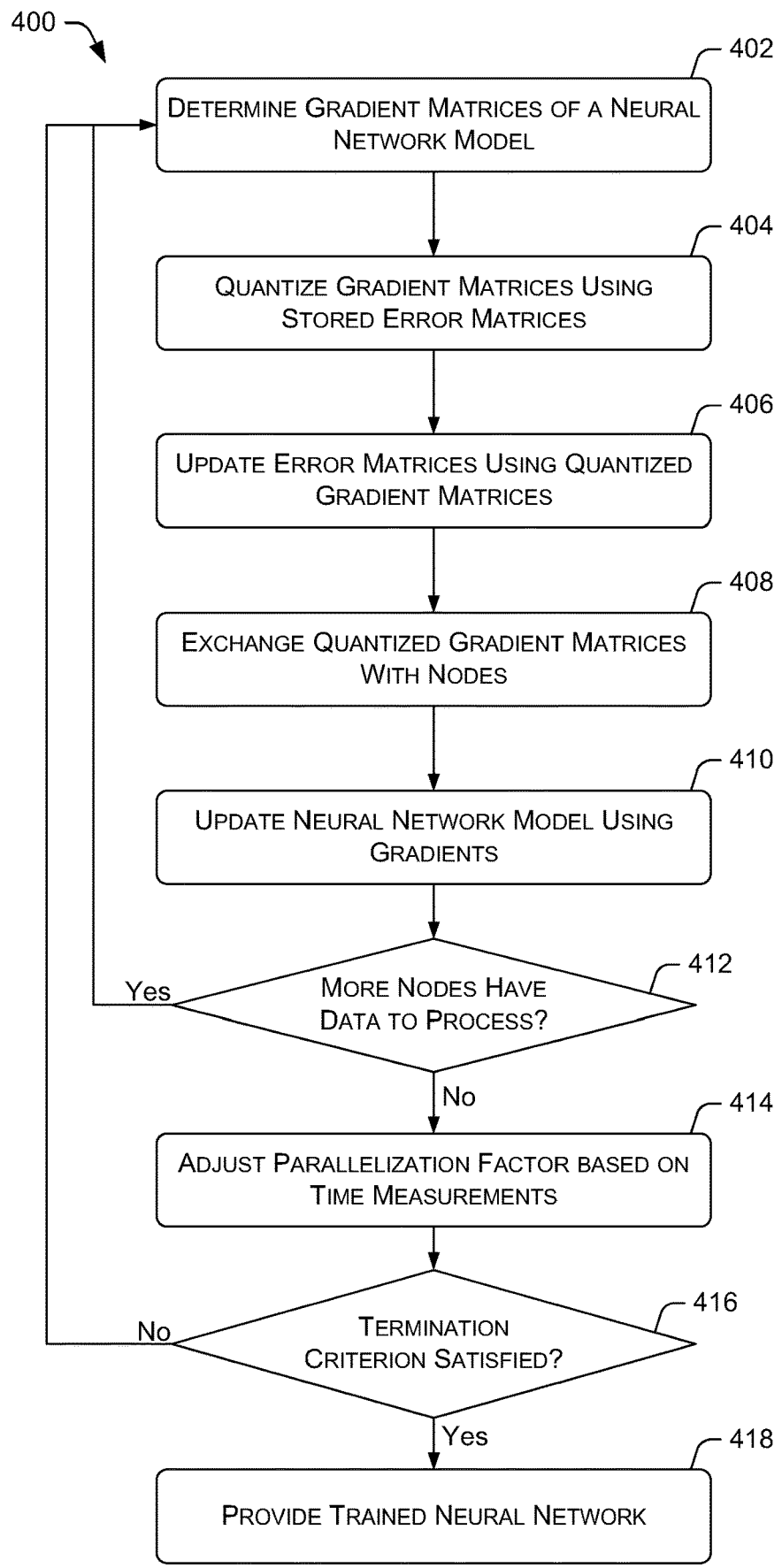
FIG. 4 is a flow diagram that illustrates an example process for training a deep neural network.

FIG. 4 is a diagram showing an example process 400 for training a deep neural network.

At block 402, a training engine, such as the training engine 118 of FIG. 1, the training engine 202 of FIG. 2, or the training engine 302 of FIG. 3, determines gradient matrices of a neural network model. As noted above with reference to update-determining module 326, the training engine 202 can perform, e.g., a step of stochastic gradient descent (SGD, e.g., Equation (5)), or another neural-network training algorithm, or of a combined neural-network training algorithm including SGD and other techniques. The terms "matrix" and "matrices" do not require any particular dimension or size of matrices. Gradient matrices can be as small as a single scalar and have any number of dimensions and any extent in those dimensions. In an example, the gradient matrices are 2048×2048.

At block 404, the training engine 202 quantizes the gradient matrices using corresponding stored error matrices. For example, the error matrices can be incorporated in the quantization as discussed below, e.g., with reference to Equation (10). The quantization can include, e.g., determining single-bit representations such as approximate single-bit representations for respective elements of the gradient matrices. In some examples, quantized representations can have two bits per value, three bits, or any number b of bits per value for b less than the bit count B of the gradient matrices before quantization. At block 406, the training engine 202 updates the error matrices using (e.g., incorporating) the corresponding quantized gradient matrices.

In at least one example, quantization (block 404) and updating (block 406) are performed according to Equations (10) and (11), in which $G_{ijl}(t)$ is a gradient parameter, $G_{ijl}^{quant}(t)$ is the quantized representation thereof, $Q(\cdot)$ is the quantization function, $Q^{-1}(\cdot)$ is the corresponding inverse quantization (reconstruction) function, $\Delta_{ijl}(t)$ is the quantization error, N is the minibatch size, and t is the sample index.

$$G_{ijl}^{quant}(t) = Q(G_{ijl}(t) + \Delta_{ijl}(t-N)) \qquad (10)$$

$$\Delta_{ijl}(t) = G_{ijl}(t) - Q^{-1}(G_{ijl}^{quant}(t)) \qquad (11)$$

As can be seen, the quantization error $\Delta_{ijl}(t-N)$ for sample t−N in a minibatch is used in determining the quantized value $G_{ijl}^{quant}(t)$ of the corresponding sample in the next minibatch. Moreover, the error matrix Δ is updated ($\Delta_{ijl}(t)$) so that the error will be corrected as much as possible for the given $Q$ in the next quantization, of sample t+N.

In at least one example, the quantization function is a threshold function as shown in Equation (12):

$$Q(x) = \begin{cases} 1, & x \geq 0 \\ 0, & x < 0 \end{cases} \qquad (12)$$

This function provides a 1-bit output $Q(x)$ for the value x to be quantized. Other quantization functions can be used, e.g., to divide a selected range for x (e.g., [0,1]) into a selected number of equally-spaced steps (e.g., $2^n$ steps for an n-bit quantized value, or, in various examples, k steps, k>2). In some examples, the quantization threshold is set using the gradients, as shown in Equation (13):

$$Q(x) = \begin{cases} 1, & x \geq R \\ 0, & x < R \end{cases} \quad (13)$$

where $R=\overline{G_{ijl}(t)}$ to use data from the current minibatch, or $R=\overline{G_{ijl}(t-N)}$ to use data from the previous minibatch. Throughout this disclosure, t−N can be replaced with t−kN for integer k>0. That is, for quantization, reconstruction, or any purpose herein, data more than one minibatch old can be used.

At block 408, the training engine 202 exchanges the quantized gradient matrices with a number of nodes. Block 408 can include the training engine 202 transmitting some or all of the quantized gradient matrices to at least one other node, e.g., at least one other computing device 210 or processing unit 212, FIG. 2. Block 408 can include a plurality of computing devices 210 transmitting respective quantized gradient matrices to others of the plurality of computing devices. The nodes can exchange the quantized gradient matrices synchronously. An example of this exchange is discussed below with reference to FIG. 5. The exchanging can include reconstructing gradient values from the received quantized values (e.g., using Equations (14) or (15) below). In an example, the exchanging block 408 comprises exchanging only the quantized gradient matrices. In at least one example, the exchanging block 408 comprises exchanging the quantized gradient matrices and cross-entropy (CE) criterion values of one or more node(s). The CE criterion values can be used to track progress of the neural-network training. In an example, the exchanging block 408 comprises exchanging quantized gradient matrices, reconstructing gradient values, aggregating reconstructed values, quantizing the aggregated values, and exchanging the quantized aggregated values, e.g., as discussed below with reference to FIGS. 5 and 6.

At block 410, the neural network model is updated using the gradients. This can be done, e.g., as described above with reference to Equation (5) above. The reconstructed gradient values can be used. Aggregated gradients can be used as discussed below with reference to FIGS. 5 and 6.

At decision block 412, the training engine 202 may determine whether more nodes have data to process. If so, the process may return to block 402. If not, the process may proceed to block 414. In this way, the determining block 402, quantization block 404, updating block 406, exchanging block 408, and model-updating block 410, or any combination of those blocks, can be performed by individual ones of the nodes for respective ones of the gradient matrices and the error matrices corresponding to the respective ones of the gradient matrices. The nodes can perform this processing in parallel to reduce training time.

At block 414, in some examples, a parallelization factor can be adjusted as a function of batch size based at least in part on time measurements. As noted above, the minibatch size N and the number of nodes K computing in parallel affect the total training time. These values can be adjusted based on measurements of the time spent communicating or computing to increase training speed.

At decision block 416, the training engine 202 may determine a selected termination criterion has been satisfied. If so, the training process can be determined to be complete. More than one criterion can be used, e.g., indicating completion when one criterion is satisfied (or a selected number of criteria are satisfied) or indicating completion when all criteria are satisfied. When training is complete, the training engine 202 can provide the trained DNN 208 to the data analysis engine 206, both FIG. 2. If the criterion has not been satisfied, the process may return to block 402. In this way, any or all of the determining block 402, quantization block 404, updating block 406, exchanging block 408, model-updating block 410, decision block 412, and adjusting block 414 can be repeated for each of a plurality of minibatches of the neural network model. In at least one example, exchanging for a first minibatch is performed by block 408 in parallel with the determining, quantization, or updating for a second minibatch.

An example criterion can be accuracy. The training-frame accuracy of the DNN, e.g., DNN 204 or 304, can be evaluated during training, and the criterion can be at least a selected training-frame accuracy. The DNN can be periodically tested on a test set of inputs and the error rate determined, and the criterion can be at most a selected error rate. An example criterion can be elapsed training time. For example, after a selected elapsed time or a selected number of training epochs, training can be terminated. This can terminate training if the DNN is not converging for the particular parameters used. An example criterion can be improvement in either training-frame accuracy or error rate. The criterion can be less than a selected improvement in either of those quantities. For example, if the training-frame accuracy approaches an asymptote or is only increasing, e.g., <0.1% point per epoch, training can be terminated on the supposition that the DNN has substantially converged.

At block 418, after training is determined to be complete, e.g., because the termination criterion is satisfied, the trained neural network, e.g., trained DNN 208 or 318, is provided. In an example, the weights $W^l$ and biases $a^l$ from Equation (5) at the conclusion of training are stored to a computer-readable medium, e.g., a computer-readable storage medium such as computer-readable media 312. In at least one example, block 418 includes performing a neural-network algorithm using the stored weights and biases, e.g., in DNN operation engine 120 or data analysis engine 206, to process input data 236 to produce output data 234.

FIG. 5 is a dataflow diagram 500 showing steps in an example process for exchanging data. This process can be carried out cooperatively by multiple nodes having respective exchanging blocks 408, FIG. 4. This process is also referred to herein as an "all-reduce." In this example, three nodes participate, as indicated by the "Node 1" through "Node 3" labels in FIG. 5.

Minibatch 502 includes a plurality of randomly sampled frames 218 from the training data 216, both FIG. 2. In various examples, minibatch 502 can be divided into sub-minibatches 504, 506, 508, e.g., by a processing unit configured to coordinate the efforts of nodes. In some examples, one or more of the nodes can divide minibatch 502. In at least one example, an individual node retrieves only its corresponding sub-minibatch 504, 506, 508 from minibatch 502.

In this example, each of Nodes 1, 2, and 3 receives one respective sub-minibatch 504, 506, 508 of training data 216 and computes modification values of a computational model based on the received sub-minibatch of the training data. In one example, the computational model is a neural-network model and the updates are gradients suitable for use in a stochastic gradient descent (SGD) process, e.g., as described above with reference to Equation (5). This example will be used throughout the discussion of FIG. 5 for clarity, but the techniques described and shown are not limited to neural networks or to SGD.

Block 510 represents the gradients computed by Node 1 using sub-minibatch 504. Block 512 represents the gradients computed by Node 2 using sub-minibatch 506. Block 514 represents the gradients computed by Node 3 using sub-minibatch 508. It is desirable for individual nodes to receive information about the gradients computed by the other nodes. Such receiving permits an individual node to update its neural-network model in preparation for the next iteration of the SGD process.

As discussed above with reference to exchanging 230, to permit efficiently exchanging gradient information with other nodes, an individual node partitions its gradients into "stripes." In this example, block 510 includes stripes 516, 518, 520; block 512 includes stripes 522, 524, 526; and block 514 includes stripes 528, 530, 532. The stripes respectively correspond to different subsets of the parameters of the computational model.

In an example, the computational neurons in a single layer 222 of DNN 204, both FIG. 2, can be assigned to one of three portions. Each stripe relates to the weights and biases of the computational neurons in a respective portion. An example of the relationship between stripes and the corresponding training data and model subsets is set forth in Table 1 below. In this example, sub-minibatch 504 includes 300 samples of data, numbered 1-300. Sub-minibatch 506 includes samples 301-600 and sub-minibatch 508 includes samples 601-900.

TABLE 1

| Node   | Samples | Subset 1 | Subset 2 | Subset 3 |
|--------|---------|----------|----------|----------|
| Node 1 | 1-300   | 516      | 518      | 520      |
| Node 2 | 301-600 | 522      | 524      | 526      |
| Node 3 | 601-900 | 528      | 530      | 532      |

As indicated by Table 1, in order to determine the model parameters for Subset 1 of the model parameters, the gradients from stripes 516, 522, and 528 can be combined into an aggregate stripe 534, and likewise stripes 518, 524, 530 for Subset 2 into aggregate stripe 536 and stripes 520, 526, 532 for Subset 3 into aggregate stripe 538.

Accordingly, in a first phase ("Phase 1"), Nodes 1-3 exchange data among themselves so that each node, in this example, aggregates the stripes corresponding to a single subset. The transfers indicated by the solid lines can be performed concurrently, and the transfers indicated by the dashed lines can be performed concurrently. The transfers in this example are given in Table 2 below. Borders separate groups of transfers that can be performed concurrently.

TABLE 2

| Transfer stripe | of Subset | from node | to node | as part of aggregate stripe |
|-----------------|-----------|-----------|---------|-----------------------------|
| 518             | 2         | 1         | 2       | 536                         |
| 526             | 3         | 2         | 3       | 538                         |
| 528             | 1         | 3         | 1       | 534                         |
| 520             | 3         | 1         | 3       | 538                         |
| 522             | 1         | 2         | 1       | 534                         |
| 530             | 2         | 3         | 2       | 536                         |

In the example of Table 2, Node 1 aggregates its own stripe 516 (i.e., stripe 516 of gradients computed by Node 1, indicated by the dotted arrow) with received stripes 522 and 528 to provide aggregate stripe 534 for Subset 1. Aggregate stripe 534 includes the gradients (or an aggregate, e.g., a sum, thereof) of Subset 1 of the model with respect to training samples 1-900. Similarly, Node 2 aggregates its own stripe 524 with received stripes 518 and 530 to provide aggregate stripe 536 for Subset 2. Node 3 aggregates its own stripe 532 with received stripes 520, 526 to provide aggregate stripe 538 for Subset 3.

In the example discussed above, Nodes 1-3 exchange data among themselves. In at least one example, the aggregation operation(s) to provide one or more of the aggregate stripes 534, 536, 538 is/are performed on a node different from Nodes 1, 2, and 3. In some examples, aggregation operation(s) is/are performed on one of Nodes 1, 2, and 3 for other node(s), or for that node and other node(s). The aggregate stripes 534, 536, 538 can be provided by a node performing aggregation to node(s) needing the aggregate stripes. The number of node(s) performing aggregation can be the same as or different from the number of node(s) computing gradients.

As discussed above with reference to Equation (10), the gradient values can be quantized before being transferred in Phase 1. An individual node can quantize the gradient values it transmits, e.g., stripes 518, 520 for Node 1. An individual node can then perform an inverse quantization $Q^{-1}$ on the received values to determine corresponding reconstructed values before aggregating the aggregate stripes 534, 536, 538. The inverse quantization can be determined, e.g., using the means of a previous column of data separated into their quantization bins (e.g., a mean of ~2000 values). In at least one example, inverse quantization can be performed as shown in Equation (14):

$$Q^{-1}(x) = \overline{G_{ijl}(t-N)} \text{ for all } j,l \text{ such that } Q(G_{ijl}(t-N)) = x \qquad (14)$$

In an example of one-bit quantization (q=0 or 1), $Q^{-1}(0)$ is the mean of the values in the previous minibatch that quantized to 0, and $Q^{-1}(1)$ is the mean of the values in the previous minibatch that quantized to 1. This can provide a minimum square error estimate. In at least one example, the reconstructed values can be the minimum and maximum of a previous minibatch's gradients as shown in Equation (15):

$$Q^{-1}(x) = \begin{cases} \max_{j,\ell} G_{ij\ell}(t-N), & x = 1 \\ \min_{j,\ell} G_{ij\ell}(t-N), & x = 0 \end{cases} \qquad (15)$$

Between phases 1 and 2, Nodes 1-3 (or other node(s) performing aggregation, or any combination of computation and aggregation nodes) can perform further processing on the data of aggregate stripes 534, 536, 538. In an example, the processing includes momentum smoothing. In an example, the processing includes AdaGrad normalization of gradients.

In a second phase ("Phase 2"), Nodes 1-3 exchange the aggregate stripes so that each node, in this example, has the full model, including all three subsets. The transfers are set forth in Table 3 below. Solid and dashed lines on FIG. 5, and borders in Table 3, are as discussed above with reference to Phase 1. Dotted lines on FIG. 5 during Phase 2 represent reuse of the already-computed aggregate stripes 534, 536, 538 by Nodes 1, 2, 3, respectively.

TABLE 3

| Transfer aggregate stripe | of Subset | from node | to node |
|---|---|---|---|
| 534 | 1 | 1 | 2 |
| 536 | 2 | 2 | 3 |
| 538 | 3 | 3 | 1 |
| 534 | 1 | 1 | 3 |
| 536 | 2 | 2 | 1 |
| 538 | 3 | 3 | 2 |

After Phase 2, Node 1 has all the gradients for the full model, samples 1-900, in block 540. Node 2 has the full set of gradients in block 542, and Node 3 has the full set of gradients in block 544. Each block 540, 542, 544 includes the three aggregate stripes 534, 536, 538.

In various examples, the nodes quantize the gradient values in the aggregate stripes 534, 536, 538 before transferring them in Phase 2. The nodes receiving the quantized aggregate gradient values can then reconstruct ($Q^{-1}$) those values and use the resulting reconstructed gradients to update the computational model, e.g., DNN 114.

The technique described in FIG. 5 uses two phases to exchange data between three nodes. In general, for K nodes, K>1, this technique uses K−1 phases. An individual node transfers one $K^{th}$ of the gradients twice in each phase. In example systems using crossbars or similar devices to interconnect the nodes, in each phase, all K nodes can transfer information simultaneously. In these examples, the time required for any given data transfer is only the transfer time for one $K^{th}$ of the gradients. Representing the total size of the gradient data as M, the time required to complete the illustrated transfer in these examples is on the order shown in Equation (16):

$$\underbrace{M}_{\text{gradients}} \times \underbrace{1/K}_{\substack{\text{time per}\\\text{transfer}}} \times \underbrace{2}_{\substack{\text{transfers}\\\text{per phase}}} \times \underbrace{K-1}_{\substack{\text{number of}\\\text{phases}}} \qquad (16)$$

or O(2M(K−1)/K)≈O(M). Therefore, the time required to perform the data exchanges illustrated in FIG. 5 is approximately independent of the number of nodes K, when simultaneous transfers are used. This advantageously permits increasing the number of nodes K participating in the parallel processing, and increasing the training speed correspondingly, without suffering reduced performance due to transmission overhead.

Figure 6:
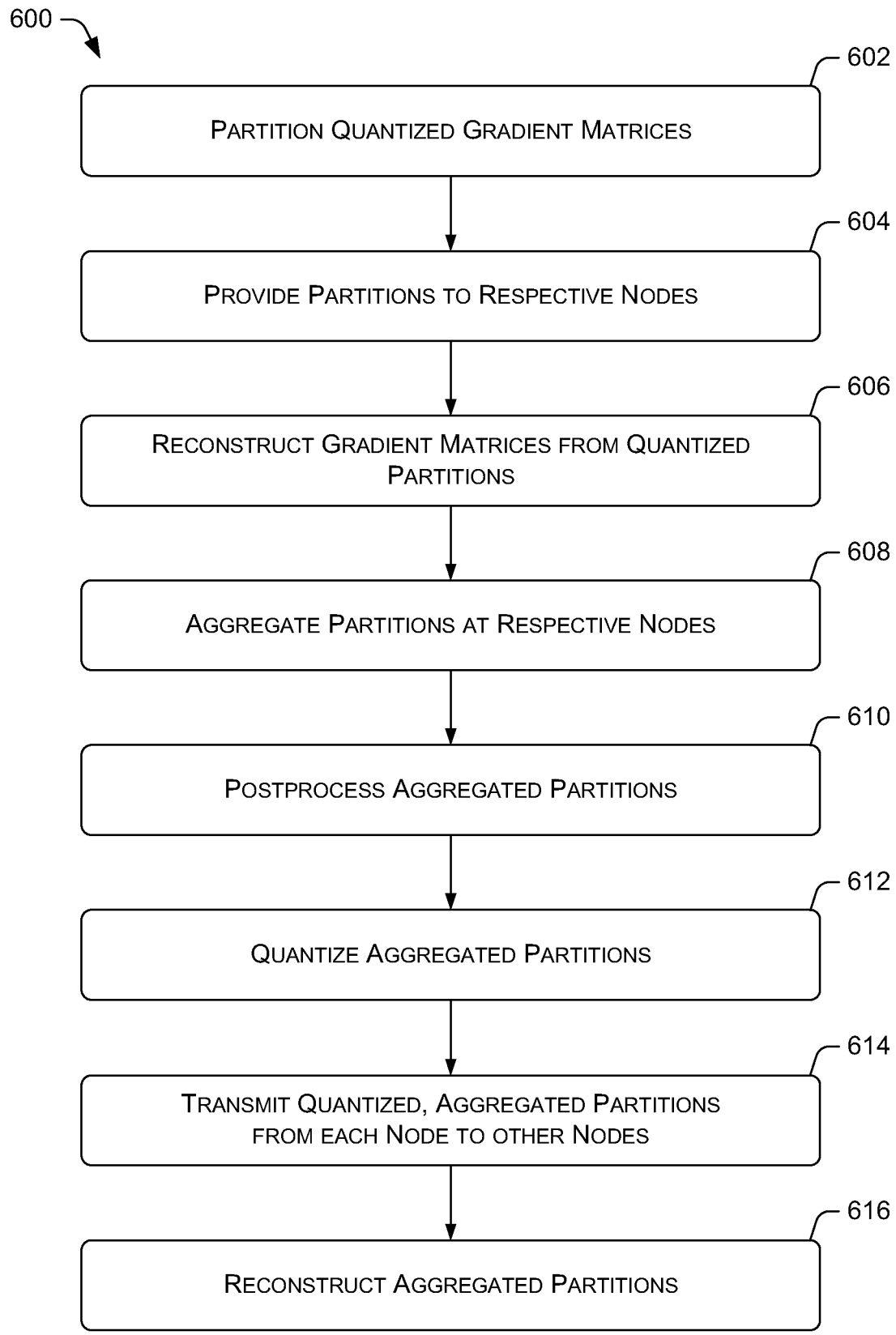
FIG. 6 is a flow diagram showing example process for exchanging data between nodes for training a deep neural network.

FIG. 6 is a flow diagram showing steps in an example process 600 for exchanging data, e.g., as discussed above with reference to block 408, FIG. 4. Reference is made in the following discussion to FIGS. 5 and 6. The example process receives as input quantized gradient matrices from block 404, FIG. 4.

At block 602, the gradient matrices are partitioned. The gradient matrices can be partitioned according to the number K of the nodes or a different number. As noted above, node(s) performing aggregation can be the same as or different from node(s) performing computation. In at least one example, the gradient matrices can be partitioned according to the number of node(s) performing aggregation. The gradient matrices can be quantized, as discussed above. The individual partitions resulting from this partitioning are referred to herein as "stripes." An example of this partition is the division of blocks 510, 512, 514 into stripes, as discussed above.

At block 604, individual stripes (partitions) are provided to respective ones of the nodes. That is, individual ones of the partitions of the quantized gradient matrices are provided to respective ones of the nodes. In the example of FIG. 5, stripe 516 is already resident at Node 1. The providing block 602 therefore can include selection, by a processing unit 212 associated with Node 1, of the data of stripe 516 for further processing. Stripes 522 and 528 are not resident at Node 1, so the providing block 602 can include Node 2 transferring stripe 522 to Node 1 (dashed arrow) and Node 3 transferring stripe 528 to Node 1 (solid arrow). Similarly, stripes 518 and 530 are transmitted to Node 2 and stripe 524 is selected by Node 2 as part of the providing block 602, and stripes 520, 526 are transmitted to Node 3 and stripe 532 is selected by Node 3. The example transfers shown in FIG. 5 are summarized in Table 2 above.

In some examples, at block 606, the gradient matrices are reconstructed from the data of the quantized partitions. Reconstruction can be performed as described herein. In an example, block 604 includes transmitting a table of $(q, Q^{-1}(q))$ values along with the quantized values q, and reconstruction includes looking up quantized values q in the table.

At block 608, the received partitions are aggregated at corresponding ones of the nodes. This corresponds to the production of aggregate stripes 534, 536, 538 in FIG. 5. The aggregating can include, e.g., summing the reconstructed gradients.

In some examples, at block 610, the modification values, e.g., the gradient values, in the aggregated partitions can be further processed, e.g., as discussed above with reference to FIG. 5. In an example, the processing includes momentum smoothing. In an example, the processing includes AdaGrad normalization of gradients.

In some examples, at block 612, the modification values, e.g., the gradient values, in the aggregated partitions can be quantized. The quantization can use the same quantization function as used in block 404, or a different quantization function. Reconstructed values can be determined as described herein with respect to the quantization of gradient matrices (block 404).

At block 614, the aggregated data, e.g., the quantized aggregated partitions, are transmitted from individual ones of the nodes, which produced the partitions, to the others of the nodes. For example, aggregate stripe 534 is transmitted from Node 1 to Nodes 2 and 3, and likewise for the other transfers described in Table 3 above.

In some examples, at block 616, the aggregated partitions are reconstructed, e.g., as described above with reference to block 606. Block 616 can be followed by block 410, FIG. 4.

The example process of FIG. 6 can also be used with other computational models in place of a neural network model, and with other modification values in place of the gradients.

Illustrative Results

Various experiments were performed to test a system for DNN training according to various examples herein. A CD-DNN-HMM ("model") was trained on the SWBD-I training set (309 hrs. of audio). The model had seven hidden layers of dimension 2048 and an output dimension of 9304, for a total of M=46M model parameters. The test set used was Hub-5'00 (1831 utterances). Tests were performed on a server equipped with 8 NVIDIA TESLA K20Xm GPU cards. Tests were also performed on a server farm of 24 dual-K20Xm servers connected through INFINIBAND.

The DNN training used 1-bit quantization as described above, with 0 (zero) as the quantization threshold. In one test, the first 24 hr. of data were processed without parallelism or quantization. The remaining data were processed using the 1-bit quantization with error feedback as discussed above (e.g., Equations (10) and (11) together), with K=4. The word error rate and training-frame accuracy were not significantly altered by the addition of quantization with error feedback. In another test, AdaGrad adaptive learning weights were applied to quantized gradients. This configuration improved frame accuracy by 1.7% over AdaGrad applied to non-quantized gradients. This configuration, with K=4, provided a training time of 8.1 hr. This compares to a training time of 35 hr for a corresponding non-parallelized test. Accordingly, parallelizing operation and using quantized gradients can provide a substantial improvement in training speed, i.e., a substantial reduction in training time. As noted above, this increase in speed does not sacrifice the quality of results from the trained DNN 208. In another test, the DNN with AdaGrad was tested with and without batch size adjustment (e.g., batch selection 224, FIG. 2). Using batch size adjustment reduced the training time from 41 hr. to 35 hr. Tests were also performed comparing data and model parallelism. In various examples, only data parallelism is used. For example, a test of a system with 4×2 (data/model) parallelism had a training speed of 40.9 kfps, compared to a higher speed of 50.6 kfps for a system with 8×1 parallelism. In one test, a production-scale model of 160M parameters completed one pass through 3,300 hours of training data in under 24 hours of elapsed time. These examples demonstrate that quantization, e.g., 1-bit quantization, speeds data transfer and makes data-parallel SGD feasible with substantially no loss of accuracy.

Example Clauses

A: A method comprising: determining gradient matrices of a computational model of an optimization problem, e.g., a neural network model; quantizing the gradient matrices using (e.g., incorporating) corresponding stored error matrices; updating the error matrices using the corresponding quantized gradient matrices; and exchanging the quantized gradient matrices with a number of nodes.

B: A method as paragraph A recites, wherein the determining, quantizing, and updating are performed by individual ones of the nodes for respective ones of the gradient matrices and the error matrices corresponding to the respective ones of the gradient matrices.

C: A method as either paragraph A or B recites, further including reconstructing the quantized gradient matrices after the exchanging.

D: A method as either paragraph A or B recites, further including updating the neural network model using the gradient matrices.

E: A method as any of paragraph B, C, or D recites, further comprising repeating the determining, quantizing, updating, and exchanging steps for each of a plurality of minibatches of the neural network model, the exchanging for a first one of the minibatches being performed in parallel with the determining, quantizing, or updating for a second one of the minibatches.

F: A method as paragraph E recites, the exchanging comprising exchanging the quantized gradient matrices, e.g., exchanging only the quantized gradient matrices.

G: A method as either paragraph E or F recites, wherein the nodes exchange the quantized gradient matrices synchronously.

H: A method as any of paragraphs E-G recites, the exchanging comprising: partitioning the quantized gradient matrices, e.g., according to the number of the nodes; providing individual ones of the partitions of the quantized gradient matrices to respective ones of the nodes; aggregating the received partitions at the nodes; and transmitting the aggregated data from individual ones of the nodes to the other ones of the nodes.

I: A method as any of paragraphs A-H recites, further including adjusting a parallelization factor as a function of batch size based at least in part on time measurements.

J: A method as any of paragraphs A-H recites, the quantizing comprising determining a single-bit representation for, e.g., an approximate single-bit representation of, each element of the gradient matrices.

K: A computer-readable medium, e.g., a computer storage medium, having thereon computer-executable instructions, the computer-executable instructions to upon execution configure a computer to carry out the method of any of paragraphs A-J.

L: A device comprising: a processor; and a computer-readable medium, e.g., a computer storage medium, having thereon computer-executable instructions, the computer-executable instructions to upon execution configure the device to carry out a method as any of paragraphs A-J describe.

M: A system comprising: means for processing; and means for storing having thereon computer-executable instructions, the computer-executable instructions including means to configure the device to carry out a method as any of paragraphs A-J describe.

N: A system comprising: one or more computer-readable media, e.g., computer storage media, having thereon a plurality of modules and a computational model of an optimization problem; and a plurality of nodes, each including at least one processing unit, each processing unit operably coupled to at least one of the computer-readable media, the processing units adapted to intercommunicate and to execute modules of the plurality of modules comprising: an update-determining module configured to determine modification values of the computational model; a quantization module configured to quantize the determined modification values using stored error values and to update the stored error values using the determined modification values and the quantized modification values; a transferring module configured to transmit at least some of the quantized modification values to at least one other of the processing units; and an updating module configured to modify the stored computational model according to received quantized modification values.

O: A system as paragraph N recites, the quantization module further configured to reconstruct modification values using the transferred quantized gradient modification values and the updating module configured to modify the stored computational model according to the reconstructed modification values.

P: A system as paragraph N recites, wherein at least one of the nodes transmits the quantized modification values directly to at least one other of the nodes.

Q: A system as any of paragraphs N, O, or P recites, wherein each node includes a respective memory coupled to the respective at least one processing unit and configured to store respective private quantization state including the stored error values.

R: A system as any of paragraphs N-Q recites, wherein the computational model includes a neural-network model and the update-determining module is configured to determine the modification values using a stochastic gradient descent algorithm.

S: A system as any of paragraphs N-R recites, wherein each of the nodes includes a plurality of processing units operably coupled to the respective computer-readable medium and configured to execute at least the update-determining module.

T: A system as any of paragraphs N-S recites, further including a crossbar communicatively connecting the nodes, wherein the nodes are configured to execute the transferring module to transmit the at least some of the quantized modification values via the crossbar in parallel with executing the update-determining module.

U: A system as any of paragraphs N-T recites, wherein the at least one processing unit of each node includes a general-purpose graphics processing unit (GPGPU) configured to execute the updating and quantization modules and a central processing unit (CPU) configured to execute the transferring module.

V: A system as paragraph U recites, wherein the transferring module is configured to transfer second quantized modification values from the GPGPU to the CPU in parallel with transferring the at least some of the quantized modification values to the at least one other of the processing units.

W: A computer-readable medium having thereon computer-executable instructions, the computer-executable instructions upon execution configuring a computer to perform operations comprising: determining first values of a gradient of a neural network model using a set of training samples; transmitting a first portion of the first values of the gradient; receiving second values corresponding to a second, different portion of the first values of the gradient; aggregating the second portion with the received second values; and transmitting the aggregated values.

X: A computer-readable medium as paragraph W recites, the operations further comprising quantizing the determined first values before transmitting the first portion.

Y: A computer-readable medium as either paragraph W or Y recites, the operations further comprising determining inverse quantization values and transforming the received second values using the inverse quantization values before the aggregating.

Z: A computer-readable medium as paragraph Y recites, wherein the inverse quantization values are determined at least partly based on the values of the gradient.

AA: A computer-readable medium as any of paragraphs W-Z recites, the operations further comprising overlapping the transmitting and the receiving.

AB: A system comprising: means for processing; and a computer-readable medium as any of paragraphs W-AA recites.

Conclusion

The training techniques described herein may reduce the amount of time used to train DNNs for a particular purpose, such as for speech recognition. The decreased training time may lead to an increase in the implementation and usage of the DNNs in performing speech-to-text transcription or text-to-speech synthesis.

Although the techniques have been described in language specific to structural features or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, or executed in parallel to implement the described processes. The described processes can be performed by resources associated with one or more computing device(s) 210 or processing unit(s) 212, such as accelerators or other processing units 212 described above. Such devices may include, for example, one or more internal or external CPUs or GPUs, or one or more pieces of hardware logic such as FPGAs or DSPs.

All of the methods and processes described above may be embodied in, and fully automated via, software code modules executed by one or more general purpose computers or processors. The code modules may be stored in any type of computer-readable storage medium or other computer storage device. Some or all of the methods may be embodied in specialized computer hardware.

Conditional language such as, among others, "can," "could," "might" or "may," unless specifically stated otherwise, are understood within the context to present that certain examples include, while other examples do not include, certain features, elements or steps. Thus, such conditional language is not generally intended to imply that certain features, elements or steps are in any way required for one or more examples or that one or more examples necessarily include logic for deciding, with or without user input or prompting, whether certain features, elements or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein or depicted in the attached figures should be understood as potentially representing modules, segments, or portions of code that include one or more executable instructions for implementing specific logical functions or elements in the routine. Alternative implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:
1. A method comprising:
   for each of a plurality of nodes:
      determining, by a respective node of the plurality of nodes, a respective stripe of a plurality of stripes of gradient matrices of a computational model of an optimization problem for a first minibatch of training data;

quantizing the respective stripe of the plurality of stripes of gradient matrices for the first minibatch using corresponding stored error matrices stored by the respective node;

updating the stored error matrices stored by the respective node for the first minibatch using the corresponding quantized stripe of gradient matrices;

exchanging the quantized respective stripe of the plurality of stripes of gradient matrices for the first minibatch synchronously with the plurality of nodes, wherein the exchanging comprises:

partitioning the quantized respective stripe of gradient matrices into a plurality of data stripes;

providing, to each of the plurality of nodes, a respective data stripe of the plurality of data stripes of the respective node during a first phase of the exchanging;

receiving a respective data stripe from each of the other nodes during the first phase of the exchanging;

aggregating the received data stripes into aggregated stripe data;

transmitting, to each of the plurality of nodes, the aggregated stripe data of the respective node during a second phase of the exchanging;

receiving other aggregated stripe data from each of the other nodes during the second phase of the exchanging; and recovering the full set of gradients for the computational model from the aggregated stripe data and the other aggregated stripe data;

determining a respective stripe of a plurality of stripes of gradient matrices of the computational model for a second minibatch of the training data while exchanging the quantized gradient matrices for the first minibatch; and repeating the determining, quantizing, updating, and exchanging steps for each of a plurality of minibatches of the computational model, the plurality of minibatches including the first and the second minibatches.

2. The method of claim 1, further including adjusting a parallelization factor as a function of batch size based at least in part on time measurements.

3. The method of claim 1, the quantizing comprising determining an approximate single-bit representation for each element of the gradient matrices.

4. The method of claim 1, further including reconstructing the quantized gradient matrices after the exchanging.

5. The method of claim 1, wherein the computational model includes a neural network model, the method further including updating the neural network model using the gradient matrices.

6. A non-transitory computer-readable medium having stored thereon computer-executable instructions, the computer-executable instructions upon execution configuring a computer to carry out steps including:

for each of a plurality of nodes:
determining, by a respective node of the plurality of nodes, a respective stripe of a plurality of stripes of gradient matrices of a computational model of an optimization problem for a first minibatch of training data;

quantizing the respective stripe of the plurality of stripes of the gradient matrices for the first minibatch using corresponding stored error matrices stored by the respective node;

updating the stored error matrices stored by the respective node for the first minibatch using the corresponding quantized stripe of gradient matrices;

exchanging the quantized respective stripe of the plurality of stripes of gradient matrices for the first minibatch synchronously with the plurality of node, wherein the exchanging comprises:

partitioning the quantized respective stripe of gradient matrices into a plurality of data stripes;

providing, to each of the plurality of nodes, a respective data stripe of the plurality of data stripes of the respective node during a first phase of the exchanging;

receiving a respective data stripe from each of the other nodes during the first phase of the exchanging;

aggregating the received data stripes into aggregated stripe data;

transmitting, to each of the plurality of nodes, the aggregated stripe data of the respective node during a second phase of the exchanging;

receiving other aggregated stripe data from each of the other nodes during the second phase of the exchanging; and recovering the full set of gradients for the computational model from the aggregated stripe data and the other aggregated stripe data;

determining a respective stripe of a plurality of stripes of gradient matrices of the computational model for a second minibatch of the training data while exchanging the quantized gradient matrices for the first minibatch; and repeating the determining, quantizing, updating, and exchanging steps for each of a plurality of minibatches of the computational model, the plurality of minibatches including the first and the second minibatches.

7. A system comprising:
one or more computer-readable media having thereon a plurality of modules and a computational model of an optimization problem; and a plurality of nodes, each including at least one processing unit, each processing unit operably coupled to at least one of the computer-readable media, the processing units adapted to intercommunicate and to execute modules of the plurality of modules comprising:

an update-determining module configured to determine modification values of the computational model for a first minibatch of training data, the modification values comprising, for each node of the plurality of nodes, a respective stripe of a plurality stripes of gradient matrices of the computational model for the first minibatch of training data;

a quantization module configured to quantize, for each node of the plurality of nodes, the respective stripe of the gradient matrices determined modification values for the first minibatch using stored error values stored by the respective node and to update the stored error values stored by the respective node for the first minibatch using the determined modification values and the quantized stripe of the gradient matrices determined modification values;

a transferring module configured to transmit at least some of the quantized stripes of the gradient matrices determined modification values for the first minibatch synchronously to at least one other of the plurality of nodes, wherein the transferring module is configured to:

partition each of the quantized stripes of the gradient matrices determined modification values for the first minibatch into a plurality of data stripes;

provide, to each of the plurality of nodes, a respective data stripe of the plurality of data stripes of the respective node during a first phase of transferring;

receive, by each of the plurality of nodes, respective data stripe from each of the other nodes during the first phase of the transferring;

aggregate, for each of the plurality of nodes, the received data stripes into aggregated stripe data;

transmit, to each of the plurality of nodes, the aggregated stripe data of the respective node during a second phase of the transferring;

receive, by each of the plurality of nodes, other aggregated stripe data from each of the other nodes during the second phase of the transferring; and recover, by each of the plurality of nodes, the full set of gradients for the computational model from the aggregated stripe data and the other aggregated stripe data; and an updating module configured to modify the stored computational model according to the recovered full set of gradients;

wherein the update-determining module is further configured to determine modification values of the computational model for a second minibatch of the training data while the transferring module is transmitting the at least some of the quantized stripes of the gradient matrices determined modification values for the first minibatch to the at least one other of the plurality of nodes.

8. The system of claim 7, wherein each node includes a respective memory coupled to the respective at least one processing unit and configured to store a respective private quantization state including the stored error values.

9. The system of claim 7, wherein the computational model includes a neural-network model and the update-determining module is configured to determine the modification values using a stochastic gradient descent algorithm.

10. The system of claim 7, wherein each of the nodes includes a plurality of processing units operably coupled to the respective computer-readable medium and configured to execute at least the update-determining module.

11. The system of claim 7, further including a crossbar communicatively connecting the nodes, wherein the nodes are configured to execute the transferring module to transmit the at least some of the quantized stripes of the gradient matrices determined modification values via the crossbar in parallel with executing the update-determining module.

12. The system of claim 7, wherein the at least one processing unit of each node includes a general-purpose graphics processing unit (GPGPU) configured to execute the updating and quantization modules and a central processing unit (CPU) configured. to execute the transferring module.

13. The system of claim 12, wherein the transferring module is configured to transfer second quantized stripes of the gradient matrices determined modification values from the GPGPU to the CPU in parallel with transferring the at least some of the quantized stripes of the gradient matrices determined modification values to the at least one other of the plurality of nodes.

14. The system of claim 7, the quantization module further configured to reconstruct modification values using the transferred quantized stripes of the gradient matrices determined modification values and the updating module configured to modify the stored computational model according to the reconstructed modification values.

* * * * *